(12) United States Patent
Gardner

(10) Patent No.: US 6,854,059 B2
(45) Date of Patent: Feb. 8, 2005

(54) METHOD AND APPARATUS FOR MEDIUM ACCESS CONTROL IN POWERLINE COMMUNICATION NETWORK SYSTEMS

(75) Inventor: Steven Holmsen Gardner, San Diego, CA (US)

(73) Assignee: Conexant Systems, Inc., Newport Beach, CA (US)

(*) Notice: Subject to any disclaimer, the term of this patent is extended or adjusted under 35 U.S.C. 154(b) by 793 days.

(21) Appl. No.: 09/876,454

(22) Filed: Jun. 6, 2001

(65) Prior Publication Data

US 2002/0048368 A1 Apr. 25, 2002

Related U.S. Application Data

(60) Provisional application No. 60/210,148, filed on Jun. 7, 2000.

(51) Int. Cl.[7] .................................................. G06F 9/00
(52) U.S. Cl. ....................... 713/171; 713/168; 380/284; 380/283; 380/277
(58) Field of Search .................................. 713/171, 168; 380/283, 284, 277

(56) References Cited

U.S. PATENT DOCUMENTS

| | | | | |
|---|---|---|---|---|
| 5,459,462 | A | * | 10/1995 | Venkidu et al. ................ 341/22 |
| 5,835,592 | A | * | 11/1998 | Chang et al. ................ 380/285 |
| 5,857,024 | A | * | 1/1999 | Nishino et al. ............. 713/172 |
| 6,130,896 | A | * | 10/2000 | Lueker et al. .............. 370/469 |
| 6,373,950 | B1 | * | 4/2002 | Rowney ...................... 380/255 |
| 2003/0050737 | A1 | * | 3/2003 | Osann ......................... 700/276 |
| 2003/0068033 | A1 | * | 4/2003 | Kiko ........................... 379/413 |
| 2003/0090368 | A1 | * | 5/2003 | Ide et al. ............... 340/310.06 |
| 2003/0103521 | A1 | * | 6/2003 | Raphaeli et al. ............ 370/445 |
| 2003/0133473 | A1 | * | 7/2003 | Manis et al. ................ 370/480 |
| 2004/0075535 | A1 | * | 4/2004 | Propp et al. ........... 340/310.01 |

OTHER PUBLICATIONS

Bruce Schneier, "Applied Cryptography, Protocols, Algorithms, and Source Code in C'", Second Edition Published by Wiley and Sons in 1996, pp. 1–4; 21–29; 48–68; 169–185.

* cited by examiner

*Primary Examiner*—Norman M. Wright
(74) *Attorney, Agent, or Firm*—Farjami & Farjami LLP

(57) ABSTRACT

An inventive Medium Access Control (MAC) protocol for powerline networking systems is described. The inventive MAC protocol controls access to and use of a physical medium (power lines) in a powerline networking system. The MAC protocol method and apparatus includes a method of providing "blanking intervals" in which devices using newer versions of the protocol "clear out" earlier version devices. The use of blanking intervals greatly eases backward compatibility of the network when the protocol is upgraded with new versions. The method of using blanking intervals is closely coupled to a technique of using "beacons." The beacons are used to propagate blanking interval information throughout the network. The beacons also include a mechanism for informing devices of the expiration of blanking information. The MAC also includes a method of establishing and maintaining "virtual circuit" connections between selected devices on the network. The virtual circuits can be established in powerline networking systems not having a central controller. A method of assigning unique Logical Network Identifiers (LNIs) to logical networks in the powerline networking system is also described. The LNIs uniquely identify each of the logical networks in the network. A means for creating, managing and distributing network encryption keys is also described. The encryption keys are used by the devices in the powerline networking system to prevent data from being shared with unauthorized users.

67 Claims, 4 Drawing Sheets

Reservation Establishment Process Timing Diagram

Message Flow for Reservation Renewal

Timing of Reservation Renewal Packets

CRC Used to Generate Logical Network Identifier

METHOD AND APPARATUS FOR MEDIUM ACCESS CONTROL IN POWERLINE COMMUNICATION NETWORK SYSTEMS

CROSS-REFERENCE TO RELATED PROVISIONAL APPLICATION

This application claims the benefit of U.S. Provisional Application No. 60/210,148, filed Jun. 07, 2000, entitled "Method and Apparatus for Medium Access Control in Powerline Communication Network Systems", hereby incorporated by reference herein.

BACKGROUND OF THE INVENTION

1. Field of the Invention

This invention relates to powerline communication networks, and more particularly to a method and apparatus for medium access control in powerline communication network systems.

2. Description of Related Art

The past few years have brought about tremendous changes in the modem home, and especially, in appliances and other equipment designed for home use. For example, advances in personal computing technologies have produced faster, more complex, more powerful, more user-friendly, and less expensive personal computers (PCs) than previous models. Consequently, PCs have proliferated and now find use in a record number of homes. Indeed, the number of multiple-PC homes (households with one or more PCs) is also growing rapidly. Over the next few years, the number of multiple-PC homes is expected to grow at a double-digit rate while the growth from single-PC homes is expected to remain flat. At the same time, the popularity and pervasiveness of the well-known Internet has produced a need for faster and less expensive home-based access.

As is well known, usage of the Internet has exploded during the past few years. More and more often the Internet is the preferred medium for information exchange, correspondence, research, entertainment, and a variety of other communication needs. Not surprisingly, home-based based Internet usage has increased rapidly in recent years. A larger number of homes require access to the Internet than ever before. The increase in home Internet usage has produced demands for higher access speeds and increased Internet availability. To meet these needs, advances have been made in cable modem, digital subscriber loop (DSL), broadband wireless, powerline local loop, and satellite technologies. All of these technologies (and others) are presently being used to facilitate home-based Internet access. Due to these technological advances and to the ever-increasing popularity of the Internet, predictions are that home-based Internet access will continue to explode during the next decade. For example, market projections for cable modem and DSL subscriptions alone show an imbedded base of approximately 35 million connected users by the year 2003.

In additions to recent technological advances in the personal computing and Internet access industries, advances have also been made with respect to appliances and other equipment intended for home use. For example, because an increasing number of people work from home, home office equipment (including telecommunication equipment) has become increasingly complex and sophisticated. Products have been developed to meet the needs of the so-called SOHO ("small office, home office") consumer. While these SOHO products tend to be less expensive than their corporate office product counterparts, they do not lack in terms of sophistication or computing/communication power. In addition to the increasing complexity of SOHO products, home appliances have also become increasingly complex and sophisticated. These so-called "smart" appliances often use imbedded microprocessors to control their functions. Exemplary smart appliances include microwaves, refrigerators, dishwashers, washing machines, dryers, ovens, etc. Similar advances have been made in home entertainment systems and equipment such as televisions (including set-top boxes), telephones, videocassette recorders (VCRs), stereos, etc. Most of these systems and devices include sophisticated control circuitry (typically implemented using microprocessors) for programming and controlling their functions. Finally, many other home use systems such as alarm systems, irrigation systems, etc., have been developed with sophisticated control sub-components.

The advances described above in home appliance and equipment technologies have produced a need for similar advancements in home communication networking technology. As home appliances and entertainment products become increasingly more complex and sophisticated, the need has arisen for facilitating the interconnection and networking of the home appliances and other products used in the home. Also, a need for distribution of entertainment media such as PC applications, audio streaming and voice telephony exists. One proposed home networking solution is commonly referred to as "Powerline Networking". Powerline networking refers to the concept of using existing residential AC power lines as a means for networking all of the appliance and products used in the home. Although the existing AC power lines were originally intended for supplying AC power only, the Powerline Networking approach anticipates also using the power lines for communication networking purposes. One such proposed powerline networking approach is shown in the block diagram of FIG. 1.

As shown in FIG. 1, the powerline 100 comprises a plurality of power line outlets 102 electrically coupled to one another via a plurality of power lines 104. networkAs shown in FIG. 1, a number of devices and appliances are coupled to the powerline network via interconnection with the plurality of outlets 102. For example, as shown in FIG. 1, a personal computer 106, laptop computer, 108, telephone 110, facsimile machine 112, and printer 114 are networked together via electrical connection with the power lines 104 through their respective and associated power outlets 102. In addition, "smart" appliances such as a refrigerator 115, washer dryer 116, microwave 118, and oven 120 are also networked together using the proposed powerline network 100. A smart television 122 is networked via electrical connection with its respective power outlet 102. Finally, as shown in FIG. 1, the powerline network can access an Internet Access Network 124 via connection through a modem 126 or other Internet access device.

With multiple power outlets 102 in almost every room of the modern home, the plurality of power lines 104 potentially comprise the most pervasive in-home communication network in the world. The powerline network system is available anywhere power lines exist (and therefore, for all intents and purposes, it has worldwide availability). In addition, networking of home appliances and products is potentially very simple using powerline networking systems. Due to the potential ease of connectivity and installation, the powerline networking approach will likely be very attractive to the average consumer. However, powerline networking systems presents a number of difficult technical challenges. In order for powerline networking systems to gain acceptance these challenges will need to be overcome.

To appreciate the technical challenges presented by powerline networking systems, it is helpful to first review some of the electrical characteristics unique to home powerline networks. As is well known, home power lines were not originally designed for communicating data signals. The physical topology of the home power line wiring, the physical properties of the electrical cabling used to implement the power lines, the types of appliances typically connected to the power lines, and the behavioral characteristics of the current that travels on the power lines all combine to create technical obstacles to using power lines as a home communication network.

The power line wiring used within a house is typically electrically analogous to a network of transmission lines connected together in a large tree-like configuration. The power line wiring has differing terminating impedances at the end of each stub of the network. As a consequence, the transfer function of the power line transmission channel has substantial variations in gain and phase across the frequency band. Further, the transfer function between a first pair of power outlets is very likely to differ from that between a second pair of power outlets. The transmission channel tends to be fairly constant over time. Changes in the channel typically occur only when electrical devices are plugged into or removed from the power line (or occasionally when the devices are powered on/off). When used for networking devices in a powerline communications network, the frequencies used for communication typically are well above the 60-cycle AC power line frequency. Therefore, the desired communication signal spectrum is easily separated from the real power-bearing signal in a receiver connected to the powerline network.

Another important consideration in the power line environment is noise and interference. Many electrical devices create large amounts of noise on the power line. The powerline networking system must be capable of tolerating the noise and interference present on home power lines. Some of the home power line interference is frequency selective. Frequency selective interference causes interference only at specific frequencies (i.e., only signals operating at specific frequencies are interfered with, all other signals experience no interference). However, in addition, some home power line interference is impulsive by nature. Although impulsive interference spans a broad range of frequencies, it occurs only in short time bursts. Some home power line interference is a hybrid of these two (frequency selective and impulsive). In addition to the different types of interference present on the home power lines, noise is neither uniform nor symmetrical across the power lines. For example, noise proximate a first device may cause the first device to be unable to receive data from a second, more distant device; however, the second device may be able to receive data from the first. The second device may be able to receive information from the first because the noise at the receiver of the second device is attenuated as much as is the desired signal in this case. However, because the noise at the receiver of the first device is not as attenuated as is the desired signal (because the noise source is much closer to the first device than the second), the first device will be unable to receive information from the second.

Another consideration unique to powerline networking systems is that home power line wiring typically does not stop at the exterior wall of a house. Circuit breaker panels and electric meters (typically located outside the home) pass frequencies used for home networking. In typical residential areas, a local power transformer is used to regulate voltage for a fairly small number of homes (typically between 5 and 10 homes). These homes all experience relatively small amounts of attenuation between each other. The signal frequencies of interest to powerline networking systems do not tend to pass through the transformer. Due to these electrical characteristics, signals generated in a first home network can often be received in a second home network, and vice versa. In addition, unlike internal dedicated Ethernet or other data networks, power lines are accessible from power outlets outside of the home. This raises obvious security concerns because users typically do not want to share information with unauthorized users including their neighbors.

Signals that travel outside of the house tend to encounter greater attenuation than those that originate in the same house, and thus the percentage of outlets having house-to-house connectivity is much lower than the percentage for same house connectivity. The fact that transmissions at some outlets may not be receivable at other outlets is a significant difference between powerline networking systems and a wired LAN-type communication network such as the well-known Ethernet.

Despite these and other technical concerns, powerline communication network systems are presently being developed and proposed. For example, the HomePlug™ Powerline Alliance has proposed one such powerline communication network. The HomePlug™ Powerline Alliance is a non-profit industry association of high technology companies. The association was created to foster an open specification for home powerline networking products and services. Once an open specification is adopted, the association contemplates encouraging global acceptance of solutions and products that employ it.

A very important aspect of any home powerline networking system specification is the definition of a Medium Access Control ("MAC") communication protocol. The MAC protocol should be designed to allow devices to share the powerline network in a fair manner that provides performance in terms of delivered throughput, latency, and acceptable errors. The MAC should facilitate powerline networking system performance suitable for a number of applications including file transfer, voice, networked gaming, and streaming audio/video. The MAC protocol should be designed specifically to address the technical challenges posed by powerline networking systems. For example, the MAC communication protocol for powerline networking systems should ease compatibility of upgraded devices and protocols. That is, the MAC should ease the efforts associated with installing and operating upgraded (i.e., newer version) powerline networking system protocols and devices. Heretofore, it has been very difficult (if not impossible) to operate newer version devices on powerline ing systems operating older version devices. Therefore, there is a need for a MAC protocol that eases the task of upgrading powerline networking system protocols and devices.

In addition, the prior art attempts do not provide a mechanism for establishing "circuit-like" connections wherein devices are connected together via a "virtual circuit." Most prior art network systems use a "contention-based" access approach. In this mode of access, when a device has data to send, it first determines whether a channel is being used by another device, and if it is not, the device begins data transmission. Other devices refrain from transmitting on the channel until the first device terminates its transmission. When more than one device requires transmission, a "collision" occurs and the devices re-transmit their data because procedures defined in the prior art MAC protocol require data re-transmission. As traffic on the channel increases, so too do the number of collisions, resulting in data transmission delays. The exact period of the delay is not fixed, but varies depending upon traffic characteristics. These delays may be acceptable for some applications (such as file transfers), but not others (such as streaming audio/video). The prior art solutions include use of priority schemes whereby "real-time" applications are assigned higher priorities than non-real-time applications. Disadvantageously, this approach is not ideal when there are multiple high priority users as they must still contend with one another and thus still encounter probabilistic delays. This prior art approach also disadvantageously allows a low priority device to monopolize use of a channel (once it gains use of the channel) even when there are higher priority devices waiting to use the channel.

Therefore, there is a need for a MAC protocol that overcomes the disadvantages associated with the prior art solutions. A need exists for a MAC communication protocol that permits the reservation of transmission time between devices requiring "circuit-like" connections, and especially in environments wherein no central controller is used (such as those contemplated for use in powerline networking systems). A need exists for a MAC that facilitates the establishment of "virtual circuits" between devices in a powerline networking system. The MAC should tightly control transmission delays in a powerline networking system.

Further, any MAC designed for use in powerline networking systems should provide for the management and distribution of encryption keys, even in network environments having no central controller. For example, the powerline networking systems currently being proposed and developed (such as the powerline network 100 of FIG. 1) do not contemplate use of central network controllers. One important aspect of MAC protocols designed for use in powerline networking systems is the control and distribution of encryption keys, especially in a controller-less network environment. In devices having user input/output (I/O) capabilities, encryption keys (or passwords that can be converted into encryption keys using a "hashing algorithm" or similar means) can be manually entered from the device. However, many devices may not have user I/O capability therefore making manual key entry impossible. Therefore, a need exists for a MAC communication protocol for powerline networking systems that facilitates the control and distribution of encryption keys, including the management of encryption keys for devices not having user I/O capability.

Finally, any MAC designed for use in powerline networking systems should provide for the unique assignment of logical network identifiers ("LNI"). Although all of the devices in a powerline networking system share the same physical medium (i.e., the home power lines such as the power lines 104 of FIG. 1), it is desirable to be able to separate the devices into logical networks ("LN") wherein only those devices belonging to the same logical network are allowed to share data. Using encryption schemes, data can be shared between devices that are members of a given LN, but is protected from devices that are not members of the given LN. It is very convenient and efficient to permit a device in an LN to determine which LN it belongs to. The device can use this information to determine whether it should attempt to receive a given data packet. For example, this can be accomplished by including the LNI in each data packet transmission. Alternatively, this can be accomplished by including a management message in which the transmitting device indicates its LNI. Under ideal conditions, each LN sharing the same physical medium should have a unique identifier. In powerline networking systems wherein no central controller exists, there is no convenient means for ensuring that LNIs are not accidentally re-used. For example, it is not likely that home owners would feel comfortable asking their neighbors which LNI they have selected for their LN. Therefore, a need exists for a MAC protocol for a powerline networking system that facilitates the assignment of unique Logical Network Identifiers that are not accidentally re-used by the system.

The present invention provides such a method and apparatus for Medium Access Control in powerline communication network systems.

SUMMARY OF THE INVENTION

The present invention is a novel method and apparatus for Medium Access Control (MAC) of a physical medium in a powerline networking system. Several novel aspects of the present MAC method and apparatus are described including: use of a blanking interval to ease backward compatibility; use of beacons to propagate interval timing information throughout the network; controller-less reservation-based access used to establish and maintain "virtual circuit" connections between two selected devices; methods for generating and assigning Logical Network Identifiers (LNIs) in a powerline networking system; and a method for generating, managing and distributing encryption keys, especially for devices having no user input/output capability.

The inventive MAC method and apparatus eases backward compatibility of the powerline ing system by providing a blanking interval method. In accordance with this inventive approach, blanking intervals define when previous version devices are prevented from transmitting data in the powerline network. The method described herein enables newer version devices to specify to older version devices the time periods that are reserved for use only by the newer version devices. In accordance with this approach, newer version devices first determine which newer version device controls the blanking interval timing. The selected controlling device then transmits a "medium blanking payload" message containing information that specifies when the blanking interval occurs. The blanking interval is periodic. However, its period and duration can be varied by the controlling device. Thus, the blanking interval can adapt to network traffic conditions and requirements.

A beacon method is described that is closely tied to the inventive blanking interval method and apparatus. In accordance with the present invention, a method of using beacons is provided that is used to propagate blanking interval timing information throughout the powerline networking system. Using a "lifetime" mechanism, devices are able to determine whether and when blanking interval timing information becomes obsolete. The beacons are also used by the devices to specify certain capabilities associated with the devices. The beacons are used to broadcast specific network capabilities associated with each device transmitting the beacon.

The present MAC protocol method and apparatus also provides a method for establishing "virtual circuit" connections between devices, wherein the virtual circuit connections have very tightly controlled throughput, delay, and latency characteristics. The inventive MAC protocol for powerline networking systems supports controller-less reservation based access modes that permit the creation of virtual circuit connections that provide periodic, low latency, constant bit-rate service between an originating device and a destination device. The virtual circuits are created by establishing a periodic time slot that is reserved for use only by a specific transmitter. All other devices in the network must be aware of the reservation and must avoid transmitting during the reserved time periods. The inventive method can be used in networks that have no centralized control mechanism.

In accordance with the present invention, devices can be logically separated into logical networks, wherein only devices belonging to a logical network are allowed to freely exchange information. The present invention includes a method for generating and assigning logical network identifiers (LNIs) that uniquely identify the logical networks in the system. The devices use the LNI information when determining whether to access information transmitted in a given data packet. A novel method of assigning LNIs to a logical network based upon user-selected password information is described. In one exemplary embodiment described herein, a character-based network name of variable length is used. The network name may be related to the user's street address. The name is compressed to a unique LNI using some form of a hash function. The method is particularly applicable to powerline networking systems having no central control mechanism.

Finally, a method of encryption key management and distribution is described, especially for devices having no user input/output (I/O) capability. For devices lacking user I/O capability manufacturers provide a hard-wired encryption key or default key that is not meant to be changed by users. However, the default key can be changed to be any possible value through utilization of a powerline-networked device that has user I/O capability. During an installation process, a system user inputs the default key (or a password from which the default key has been derived) that is associated with the new device (i.e., device that lacks user I/O capability) into a powerline-networked device that has user I/O capability. An application program that is suited for this task aids the device during the installation process. The device that has I/O capability utilizes the default key to encrypt the current logical network key. The inventive MAC protocol then transmits the encrypted key to the new device (i.e., device without I/O capability). The logical network key is thus securely passed to the new device and all other members of the logical network thereafter exchange encrypted data with the device. If the device loses the logical network key, or if the key changes, another device re-transmits the key using the same MAC management message originally used to provide the key.

BRIEF DESCRIPTION OF THE DRAWINGS

Like reference numbers and designations in the various drawings indicate like elements.

DETAILED DESCRIPTION OF THE INVENTION

Figure 1:
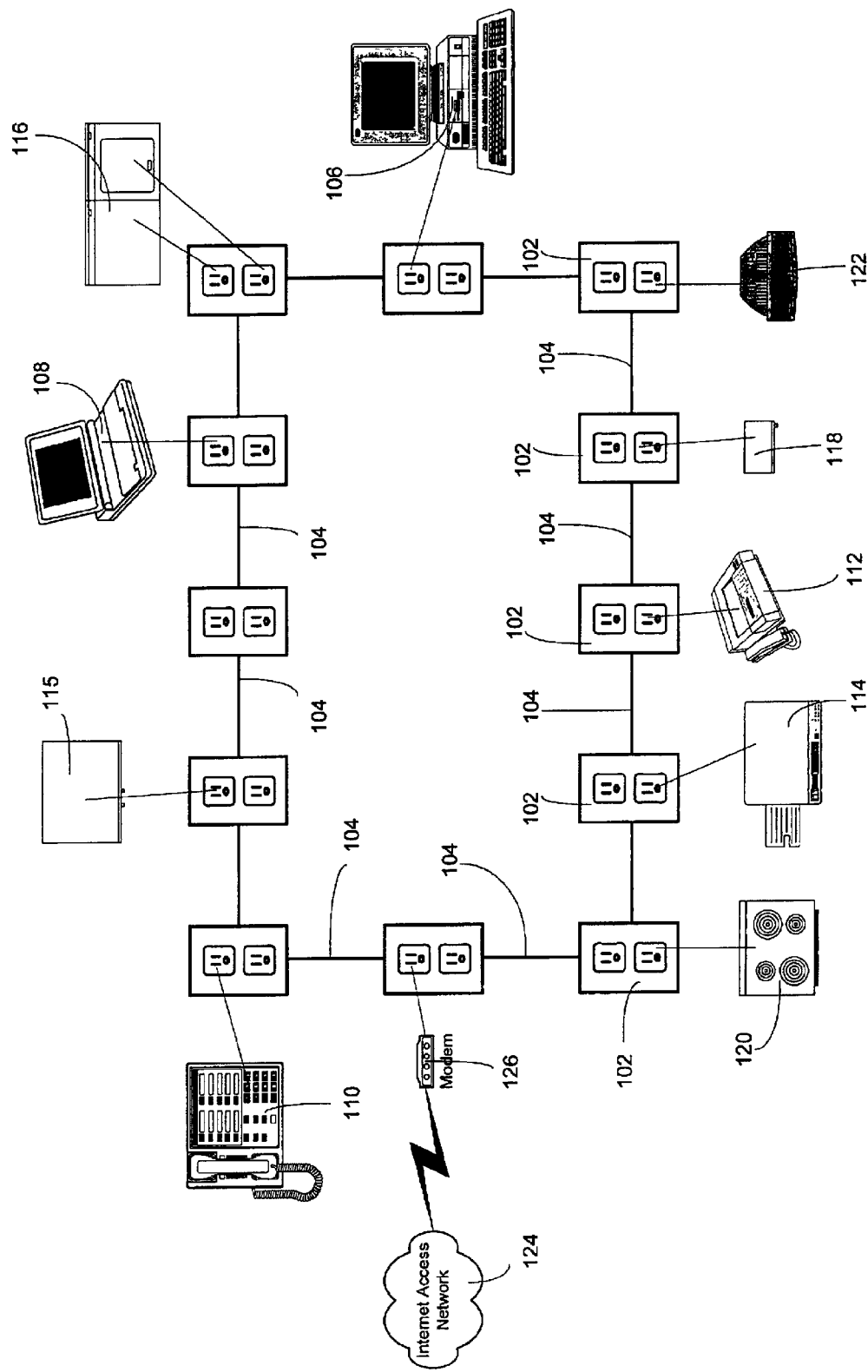
FIG. 1 shows an exemplary home powerline network system including a plurality of power line outlets electrically coupled to one another via a plurality of power lines.

Throughout this description, the preferred embodiment and examples shown should be considered as exemplars, rather than as limitations on the present invention.

The present invention is a method and apparatus for Medium Access Control (MAC) in powerline communication network systems. As described above, in home powerline ing systems, a single physical medium (the home power lines) is shared by a number of different devices (also referred to herein as "clients"). It may be desirable to allow some clients or devices to freely exchange data between them (for example, clients in a common household). In contrast, it may be desirable to prohibit certain clients from exchanging data with other clients (for example, it may be desirable to prevent a PC in a first house from exchanging data with a PC in a second house). The MAC functions to ensure that the physical medium (the home power lines) is shared in a fair, consistent, and efficient manner (i.e., at a high performance level). The performance of the powerline networking system must be sufficient to accommodate a wide variety of clients and applications, including, but not limited to, file transfer, voice, networked games, and streaming audio/video applications.

The efficiency at which communication systems use the shared communication medium is a very important performance criterion in any communication system, especially in communication systems that have a physical communication medium shared by a plurality of differing devices or clients. Because powerline networking systems are, by definition, shared-medium communication networks, access and transmission by clients in the network must be controlled. The MAC protocol is used for this purpose to control client access to the physical communication medium. The MAC determines when clients are allowed to transmit on the physical medium and when they are not allowed to transmit. In addition, if contentions are permitted, the MAC controls the contention process and resolves any collisions that may occur.

With the various types of service applications from different devices, the powerline ing system MAC should adhere to a communication protocol that minimizes contention between the devices and that allows service applications to be tailored to the delay and bandwidth requirements of each application and service. The MAC is part of a "layered" data transport protocol wherein the lowest data transport layer is the physical signaling layer.

The physical transport layer is used to interface the higher communication protocol layers with the shared physical medium. The MAC method and apparatus of the present invention is intended for use with a powerline networking physical data transport layer.

Many different types of physical layer signaling can be used with the present inventive MAC protocol layer. One exemplary approach uses a modulation referred to as Orthogonal Frequency Division Multiplexing or OFDM. This modulation achieves high bit-rates by dividing the frequency spectrum into a large number of very narrow frequency bands. Low bit-rate transmissions are transmitted using a separate carrier frequency in each of the narrow frequency bands. The appeal of this approach is that when a channel has frequency selective impairments, the protocol can be designed to determine if there are frequencies that are severely impacted on a link between two clients. If so, the clients can agree not to use those frequencies. Standard modulation schemes using adaptive equalization can also be used with the present inventive MAC without departing from the scope or the spirit of the present invention. Although the present inventive MAC protocol is intended to operate with a physical layer that uses OFDM as the underlying modulation scheme, many key aspects of the protocol are contemplated for use with other types of physical layers.

One exemplary embodiment of the present MAC method and apparatus uses a Carrier Sense Multiple Access (CSMA) protocol with modifications to support special requirements for applications having low latency requirements. The protocol supports both contention-based and reservation-based access schemes. Reservation-based access schemes operate in either a controller-less mode or in a mode wherein a network controller is used.

One exemplary embodiment of the present inventive MAC method and apparatus is described in detail in the attached Appendix A (entitled "Procedures for Medium Access Control in the PL Network System" and hereinafter referred to as the "MAC specification"). The attached MAC specification describes procedures for medium access control (MAC) including procedures for: contention-based access, beacons and medium blanking intervals, controller-less reservation based access, payload formats including definitions of pre-defined payload formats, encryption, requesting and transmitting test messages, and controller-based reservation access. Exemplary pre-defined packet formats are also described in the attached Appendix A. For example, contention-based access packets, reservation-based access packets, acknowledgment packets, preambles, FEC coding, tone masks and tone maps are described in detail.

Several aspects of the inventive MAC method and apparatus as described in the attached MAC specification of Appendix A provide advantages over the prior art solutions. Each of these aspects is described in detail below. Although an exemplary embodiment of the present MAC method and apparatus is described, those skilled in the art shall recognize that modifications can be made to the described embodiments (and in the attached MAC specification) without departing from the scope or the spirit of the present invention. Therefore, the present invention is not limited by the examples given below, but only by the scope of the claims. The concept of providing a blanking interval and a means for providing beacons is now described.

Blanking Interval—Backward Compatibility of the Powerline Networking System

As described above in the background of the invention, the powerline networks differ from closed medium communication networks (such as the well-known Ethernet data communication network typically used in an office environment) and from existing telephone networks. Backward compatibility of devices is a desirable, but not a critical feature of these existing communication systems. If sufficient performance improvement can be achieved simply by upgrading all of the devices in the network, customers usually will be persuaded to replace all of the network interface devices in the network. Unfortunately, an analogous upgrade option is unavailable in the proposed powerline networking systems. Because the physical medium (home power lines) is typically shared between neighboring homes, an inhabitant of a first home typically cannot simply replace or upgrade the hardware in a second neighboring home in order to upgrade the powerline networking system. Consequently, heretofore, network and device upgrades have had to be fully interoperable with prior generation hardware (i.e., devices designed for use with previous versions of the powerline ing system). This typically has been a very restrictive and limiting system requirement. Thus, backward compatibility is an important consideration in the development of any MAC for use in powerline networking systems.

The inventive MAC method and apparatus addresses this backward compatibility issue to facilitate fully interoperable upgrades with previous version devices and systems. As described in more detail below, the present invention provides a blanking interval during which devices compatible with newer version protocols (e.g., devices using version 1.1 of the MAC protocol) can clear out (or nullify) devices compatible with older version protocols (e.g., devices using version 1.0). The use of blanking intervals (coupled closely with the use of "beacons" described in more detail below) greatly eases backward compatibility of an upgraded protocol when new protocols are designed.

The blanking interval operates to allow later version devices to specify to earlier version devices selected time periods (blanking intervals) during which only the later version devices are allowed to communicate. The blanking intervals are reserved for communication among the later version devices only. In the embodiment described in the attached MAC specification, the blanking structure comprises repeated sequences of times during which earlier version devices are restricted from contention-based access ("the blanking period") and times when they are allowed contention-based access (the "v1.0 period"). Reservation based access by earlier version devices is allowed during the blanking period, but the reservation establishment must be initiated during the v1.0 period. Any protocol for channel access can be used during the blanking intervals as long as the protocol used confines its transmissions to the blanking interval. The inventive blanking interval technique advantageously allows protocols that are presently completely undefined to be backward compatible with existing protocols. One embodiment of the present blanking interval method is described in detail in the MAC specification of Appendix A in sections 2.2 (pages 8–10) and 3.1.2.1.1.7 (pages 29–30).

In the embodiment of the blanking interval method described in the attached MAC specification, newer version devices (referred to in the MAC specification as "non-v1.0 devices") first determine between themselves which newer version device will control the blanking interval. This newer version device specifies the blanking structure by transmitting a message referred to as a "medium blanking payload." The medium blanking payload message contains information that specifies when the blanking interval occurs. The format and fields used by one embodiment of the medium blanking payload is described at section 3.1.2.1.1.7 (pages 29–30) of the attached MAC specification. As described therein, although the blanking interval is periodic, its period and duration are parameters that can be controlled and adjusted by the controlling device. Thus the blanking interval can be adapted to meet traffic demands.

For example, the device controlling the blanking interval can monitor traffic during both the blanking and unblanked intervals. The controlling device can adjust the duration of the blanking interval (for example, by modifying the duration of a blanking time field of the medium blanking payload) to provide more or less bandwidth to previous version or later version devices, as dictated by the monitored traffic characteristics. Under typical operating environments, the blanking interval period may be set at 100 milliseconds, and the blanking interval duration may be set at 50 milliseconds. Although these exemplary values for the blanking interval will vary substantially, values of this scale result in negligible increased delay for most PC-based applications.

In the embodiment described in the attached MAC specification, the controlling non-v1.0 network device must re-transmit the medium blanking payload message at least once every five seconds. The device transmits a "ROBO" mode broadcast packet that contains the medium blanking payload message providing a network timing reference and the timing of the blanking period as described above. In the exemplary embodiment, a special contention resolution slot is provided for use by non-v1.0 devices at the conclusion of each blanking period. The contention resolution slot is advantageously used to ensure that non-v1.0 devices transmit the blanking information without collisions. As described in the attached MAC specification, in the exemplary embodiment, the timing associated with the transmission of the medium blanking messages is tied to the timing of the blanking intervals to ensure that the transmit time for the blanking messages is reserved. This advantageously prevents the transmission of another device from colliding with the medium blanking message, and thus greatly increases the probability that the medium blanking message is received.

The blanking interval method and apparatus of the present MAC protocol provides yet another advantage when used in a controller-less powerline networking system, and when used with devices requiring relatively low delays. In situations where v1.0 devices establish controller-less reservations, the controller-less reservations are allowed to continue through the duration of the blanking intervals. In accordance with this approach, the non-v1.0 devices (i.e., the devices operable with later versions of the protocol) must respect the reservations established by these v1.0 devices. Advantageously, this approach ensures that v1.0 devices requiring very low delays (e.g., v1.0 devices providing streaming audio/video information) will experience low delays even when blanking intervals are occurring.

Random Back-off Method for Preventing Collisions at the End of the Blanking Interval The present invention advantageously reduces the likelihood of collisions of v1.0 device transmissions (i.e., transmissions from devices designed to operate with earlier versions of the MAC protocol) occurring at the end of the blanking intervals. In powerline networking systems, data packets are typically presented to the device network transmitters by processes operating at higher layers of the protocol. The processes that cause the various devices to transmit (such as file transfer processes, web browsing commands, e-mail processes, etc.) typically have no relationship to the physical and MAC layer protocols of the powerline networks. Therefore, the times at which data packets are presented to the device network transmitters by the higher layer processes are independent of the timing of the blanking intervals. If a packet arrives at a v1.0 network transmitter from the higher protocol layers during the blanking interval, the packet is queued for transmission until the blanking interval ends. The longer the duration of the blanking interval, the greater the likelihood that one or more transmitters will have packets queued when the blanking interval ends. To reduce packet collisions from occurring when the blanking interval ends, the protocol does not simply allow all of the network transmitters with queued packets to transmit at the end of the blanking interval. Instead, the MAC protocol uses a "random back-off method" for the transmission of queued packets.

In accordance with the random back-off technique, each transmitter having a queued packet selects a random number "M" for use in transmitting queued packets. In one embodiment, M is defined to be an integer between 1 and some maximum value "max_slots." When the blanking interval ends, the transmitter waits for a period of time equal to M time slots. In one embodiment, the time slots are approximately 30 microseconds in duration. Alternative duration time slots can be used without departing from the scope or spirit of the present invention. If the channel is available after waiting for M time slots, the transmitter begins transmitting its queued packets. If the channel is unavailable, the MAC protocol enters the "BACKOFF state" to transmit the queued packets. The BACKOFF state is defined in detail in the attached MAC specification at section 2.1.5 (pages 7 and 8), and therefore is not defined in more detail herein.

In one embodiment of the present MAC protocol method and apparatus, the value max_slots is contained in the medium blanking message. In this embodiment, the value of max_slots is determined by the controlling non-v1.0 device and is based upon the duration of the blanking interval and the amount of v1.0 traffic anticipated in the powerline networking system. By allowing the max_slots value to be programmable and variable, and by tying the value of max_slots to the duration of the blanking interval and to the traffic volume, the present invention advantageously facilitates adjustment of the contention period based upon the traffic characteristics of the network. In an alternative embodiment where this flexibility is not required, max_slots comprises a pre-determined fixed value.

Because some clients or devices in the powerline networking system may be unable to successfully receive packets that contain the medium blanking payload messages, the inventive MAC protocol includes the capability of propagating the blanking information using "beacon" messages. Some nodes in a powerline networking system may be unable to receive medium blanking messages because channel conditions between these nodes and the controlling device are severely degraded. Therefore, the present invention provides beacons that allow devices on the network to propagate blanking information to nodes that are unable to receive medium blanking messages directly from the controlling device. As described in more detail below (and in section 2.2, at pages 9–10 of the attached MAC specification), the blanking messages are propagated through the powerline network using a "relay" technique wherein the blanking information is transmitted by other nodes in the network. The inventive technique of using beacon payload messages to propagate the blanking information throughout the powerline network is now described.

Beacon Messages—Method and Apparatus for Propagating Blanking Information throughout the Powerline Network Although the concept of using beacon messages to propagate blanking interval information is closely related to the blanking interval method and apparatus described above, the beacon messages also serve additional purposes in the present MAC protocol. The beacons are management messages that are periodically transmitted by each v1.0 node on the network. The beacon messages are used by the powerline networking system to propagate information to all nodes on the network, including nodes that are unable to receive (due to channel degradation, interference, etc.) transmissions from every other node on the network.

As defined in more detail in the attached MAC specification, in one embodiment of the present invention, each device transmits a respective and associated beacon payload message on a nominally periodic basis. The beacon payload message preferably contains a number of fields that serve various MAC protocol purposes. One exemplary embodiment of such a beacon payload message (and associated fields) is described in the attached MAC specification in section 3.1.2.1.1.1, at pages 23–24. Those skilled in the art shall recognize that alternative beacon messages (and alternative beacon message fields) can be used without departing from the spirit or the scope of the present invention.

As described in section 2.2 of the MAC specification, beacon payload messages are preferably transmitted in broadcast data packets. Each client (or device) in the powerline network transmits beacon packets at a nominal five-second rate to indicate its presence in the network, and to propagate system timing information throughout the network. If a device node is able to receive medium blanking messages from a non-v1.0 device, it simply uses the blanking information obtained from that device to assemble its beacon messages. However, if a device node is unable to receive medium blanking messages from the controlling non-v1.0 device, it must assemble its beacon message based upon information obtained from another source. In these situations, and in accordance with the present invention, the device node assembles its beacon messages based upon information received from the device beacon message containing the smallest "lifetime field" value.

In accordance with the present invention, the medium blanking messages include lifetime fields (also referred to as "logical distance" fields in the attached MAC specification). As described in detail in the MAC specification, the device nodes use the lifetime field values to determine which beacon message to use when assembling their beacon messages. When a device node receives a medium blanking payload from a non-v1.0 device, it sets the lifetime field of its beacon payload message to zero. It also sets beacon fields for the duration of the interval blanking time, duration of the v1.0 time, and max_slots value equal to the values contained in the medium blanking payload message received from the non-v1.0 device. It also computes other system timing values as described in more detail in the MAC specification.

However, if the device node cannot receive the medium blanking messages from the controlling non-v1.0 device (due to channel degradation, interference or other factors), it sets the lifetime field to a non-zero value. In the exemplary embodiment described in the attached MAC specification, the device node prepares the contents of its beacon payload message using information received from another device beacon only if it has not received a medium blanking payload message in the last five seconds. It shall be appreciated by those skilled in the art that alternative time periods can be used (i.e., the device could wait for a longer or shorter time period) without departing from the spirit or scope of the present invention. The device node prepares the contents of its beacon payload message using the beacon received in the last recent five seconds having the lowest logical distance field (or lowest "lifetime field" value). If there are multiple received beacons having the same lowest lifetime field values, then the most recently received beacon is selected by the device node.

In accordance with the present beacon method and apparatus, the device node sets the lifetime field of its own beacon payload message to a value that is equal to one more than the lifetime field of the selected beacon (the beacon payload message from which the device node last obtained its blanking information). As described above, in the exemplary embodiment, the source used for the blanking information must be a message that was received within the past five seconds. The lifetime field is also used by the present invention as a means for indicating when blanking interval information on the network has become obsolete.

For example, if the blanking interval ceases because the non-v1.0 device was removed from the network (or due to some other cause), the devices that were transmitting beacons with lifetime fields set to zero will no longer receive a medium blanking message. They will have to obtain their blanking interval information from another beacon and will thus set their lifetime fields to a value that is greater than or equal to one. In the next five-second interval, no device node will receive a beacon having a lifetime field value less than one, so the minimum lifetime value will increase to two. Every five seconds, the lifetime field value will increment until it reaches some pre-defined maximum value. In one embodiment of the present invention, the pre-defined maximum value for the lifetime field is seven. Alternative maximum values can be used without departing from the scope or spirit of the present invention. When the lifetime field value reaches its pre-defined maximum, the device nodes assume that no blanking intervals exist and that the v1.0 devices can access the channel at any time (i.e., blanking intervals are not presently in use).

The beacons not only specify the period and duration of the blanking interval, but the exact timing as to when the blanking interval begins. Thus, the beacons contain fields that provide an absolute time at which the beacon messages are transmitted. The beacons also contain a field that provides the time at which the next blanking interval will begin. This mechanism allows for the propagation of absolute system timing. As described in more detail in the attached MAC specification, the beacons also allow each device to specify certain capabilities (or limitations) associated with the device. For example, a powerline networking system may require that all device nodes accessing the system use BPSK and QPSK modulation. Further, the system may require that all of its devices allow 8-PSK and 16-QAM as options. The beacons described herein can be used to inform the system of the capabilities and limitations of associated devices. Using the information contained in the beacons, more capable nodes can be allowed to negotiate more efficient transmission modes when communicating on a point-to-point basis. In addition, the beacon method and apparatus can be used to negotiate alternative encryption algorithms.

Controller-less Reservation Based Access Method and Apparatus

As noted above in the background of the invention, the present MAC protocol method and apparatus includes a means for providing "virtual circuits" between devices connected to the powerline networking system. Most data communication networks (such as the well known Ethernet network) use "contention based access" techniques to control access to the network. In this mode of access, when a first client has data to transmit, it first checks the channel to see if it is presently being used, and if it is not being used, the first client initiates its transmissions. Other clients refrain from transmitting until this first client has finished transmitting its data. Occasionally, two or more clients may decide to transmit at the same time. In this case a "collision" will occur and typically neither client is successful in transmitting its data. Various schemes exist to resolve this situation. In most cases, the clients must eventually re-transmit their associated data until the data is successfully transmitted over the network. In order to reduce the likelihood of collisions occurring during the re-transmissions, many prior art systems use techniques to randomize the start time of the re-transmissions.

Disadvantageously, in the prior art network systems that use this type of access scheme, transmissions often do not occur immediately at the time when data is available for transmission. Indeed, when data traffic is heavy, it may take quite a while for a client to gain access to the channel. When access is finally obtained, collisions may further extend the time required to get the data through to its intended recipient. The exact delay encountered is not a fixed value, but instead follows a probability distribution. As described above, although some delays may be acceptable for some applications (such as file transfers), unpredictable delays may pose a serious problem for real-time applications (such as streaming audio, video or voice communication applications). Consequently, these type applications can only run if the prior art systems have such a light traffic load that access to the channels is almost always immediate. It is desirable to design powerline networking systems such that real-time applications are supported even during high traffic volumes.

The present inventive MAC protocol method and apparatus solves these problems by providing "virtual circuits" between devices having real-time application requirements. In accordance with the present invention, a connection can be established between two devices wherein the connection guarantees a certain throughput between two points in the network. The virtual circuit connection also is guaranteed to have a constant average bit-rate and constant delay value. Therefore, the effect of the virtual circuit connection is that it is analogous to a hard-wired circuit connection, wherein the circuit connection has a throughput that is a fraction of that of the entire powerline network.

In accordance with the present MAC protocol method and apparatus, a virtual circuit can be created by establishing a periodic time slot that is reserved for use only by a specific selected transmitter. All of the other devices in the powerline network system must be aware of the reservation and must avoid making transmissions during this reserved time period. The selected transmitter can buffer its data during the time period leading up to the reserved time slot. For example, if the selected transmitter is providing a streaming video service, video information can be temporarily buffered during the time period leading up to the reserved time. The buffered data can then be transmitted in each reserved time period. Consequently, using the reservation-based access scheme of the present inventive MAC protocol method and apparatus, transmissions from the real-time oriented applications encounter a minimum possible delay. Moreover, the delays that are encountered using this approach advantageously remain constant over time.

Controller-less Reservation Based Access Method and Apparatus—An Exemplary Embodiment An exemplary embodiment of the procedures that are used for controller-less reservation based access is described in detail in section 2.4 of the attached MAC specification, at pages 11–15. Those skilled in the art shall appreciate that alternatives to the embodiment described therein can be used without departing from the scope of the present invention. As described in the MAC specification, the powerline networking system supports controller-less reservation based access modes to allow for the creation of virtual circuit connections that provide periodic, low latency, constant bit-rate service between an originating client and a destination client.

There are three MAC management related procedures related to controller-less reservation based access: (1) establishment of the reservation, (2) renewal of the reservation, and (3) termination of the reservation. In one embodiment of the present invention, the maximum reservation duration that can be established comprises either 256 periods, or 5 seconds, whichever is smaller. At the end of this time period, the reservation must either be renewed or terminated. The renewal process provides the MAC with the ability to change the payload format in response to changing physical medium conditions.

The management packets used to establish, renew, or terminate a reservation are transmitted as broadcast packets in ROBO mode. Because certain nodes may be able to receive from only one of the two clients involved in the reservation, the reservation information is transmitted by both clients that are party to the reservation.

Reservation Establishment

A reservation is established in the exemplary embodiment using a handshake process according to which the originating client establishes the reservation and the intended recipient acknowledges the establishment. The originating client initiates the process of establishing a reservation by broadcasting a ROBO mode packet that contains a reservation establishment (RE) payload. This RE payload informs all of the other clients (or devices) in the network of the time at which the reservation is to begin, the duration of the packets to be transmitted in the reservation, the period of transmission, and the lifetime of the reservation (that is, the number of packets that will be transmitted during the course of the reservation). The RE also provides a capability for establishing a reservation for a two-way circuit connection by allowing specification of a duration for a return transmission.

A two-way reservation comprises a forward transmission and a reverse transmission. In contrast, a one-way reservation comprises a forward transmission only. The forward transmission always occurs first in the embodiment described, and is transmitted by the originating client. If a reverse transmission exists, it occurs immediately after the forward transmission completes, and is transmitted by the destination client. The reverse transmission must have the same period as the forward transmission, but it is not required to have the same duration as the forward transmission. In the embodiment described in the attached MAC specification, the maximum payload length that may be reserved for either the forward or the reverse transmission is 175 OFDM information symbols.

The reservation includes two time slots that are used to practice the present method and apparatus. A first time slot is provided in which a destination client can acknowledge the reservation. A second later time slot is provided in which clients can exchange broadcast messages that can either terminate or renew the reservation. In one embodiment, the time slot reserved for the initial reservation acknowledgment always begins 5 milliseconds after the start of the first OFDM symbol of the preamble of the packet containing the RE payload. The destination client broadcasts its reservation acknowledgment (RA) payload in a ROBO mode packet, repeating the fields describing the timing of the reservation for the benefit of clients that may have failed to receive the original reservation request.

If the originating client fails to receive the RA payload (which may happen due to a collision with its RE transmission or due to a collision with the RA), it assumes that the reservation has not been established and begins a new establishment procedure. The timing of the reservation establishment procedure is shown in the timing diagram of FIG. 2.

Figure 2:
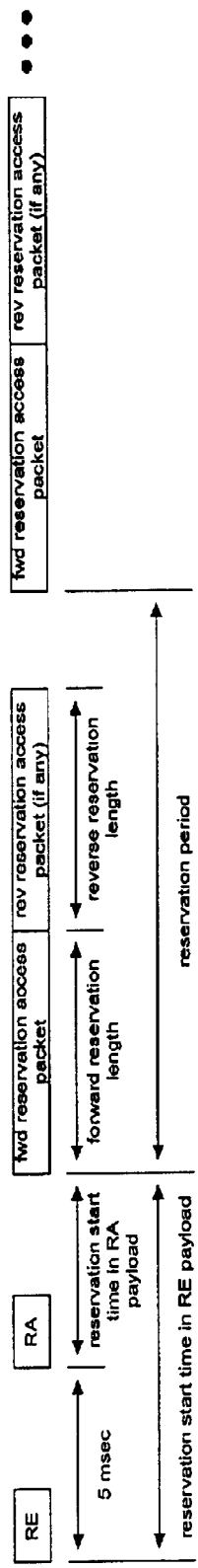
FIG. 2 is a timing diagram showing the timing of the reservation establishment procedure in accordance with present invention.

As shown in FIG. 2, once the RE and RA payloads have been exchanged, reservation access packets are exchanged according to pre-determined payload formats. In the embodiment described in the attached MAC specification, the receiving client does not acknowledge receipt of the reservation access packets.

As described above, other clients must not transmit during the reservation time. When a MAC-data.req for contention transmission is received by the MAC protocol layer, and the physical medium is determined to be available, the inventive MAC protocol layer must ensure that the physical medium remains available for the duration of the packet to be transmitted. If this is not the case, the MAC layer must enter a DEFER state and proceed as described in section 2.1.3 of the MAC specification.

Timing of the reserved slots is differential in nature. That is, each client predicts (or computes) the start of the next reserved time based upon the end of the previously reserved time. When multiple reservations are simultaneously active, the client that established the first reservation serves as a reference for all subsequent reservation timing. Thus, the next reserved time for each active reservation is computed relative to the most recent transmission of the first reservation. When the first reservation concludes, the client that established the next reservation becomes the reference for further calculations. Clients that require different reservation periods from that being used by existing reservations must select a period such that no multiples of that period overlap reserved slots.

Reservation Renewal and Termination

Figure 3A:
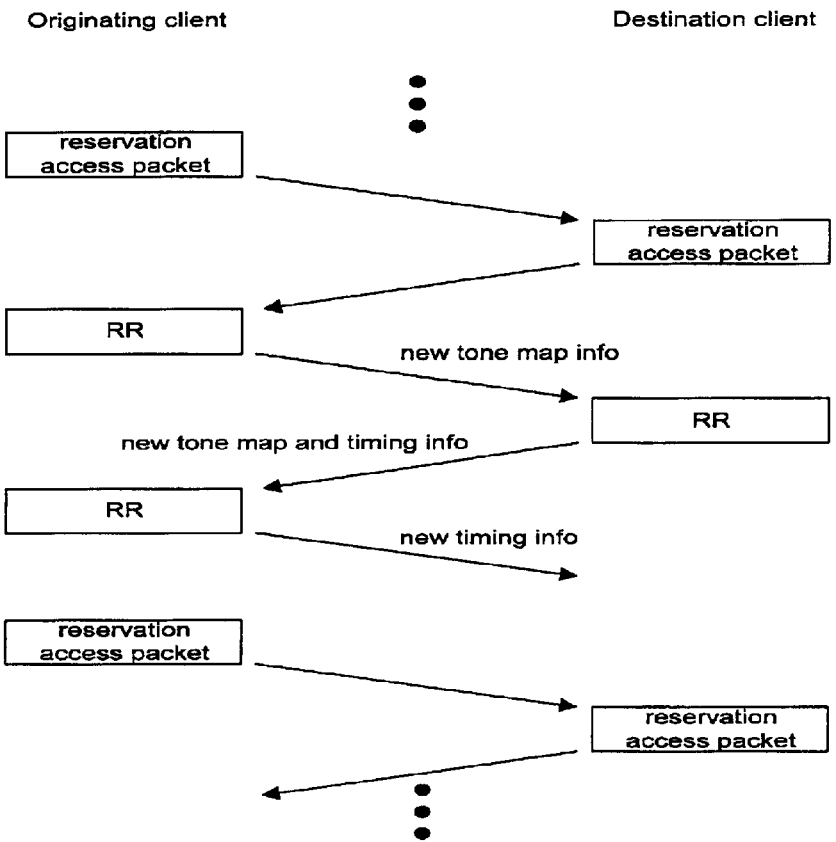
FIG. 3a is a message flow diagram showing the three-way handshake used to renew or terminate reservations in accordance with the reservation renewal process of the present invention.
Figure 3B:
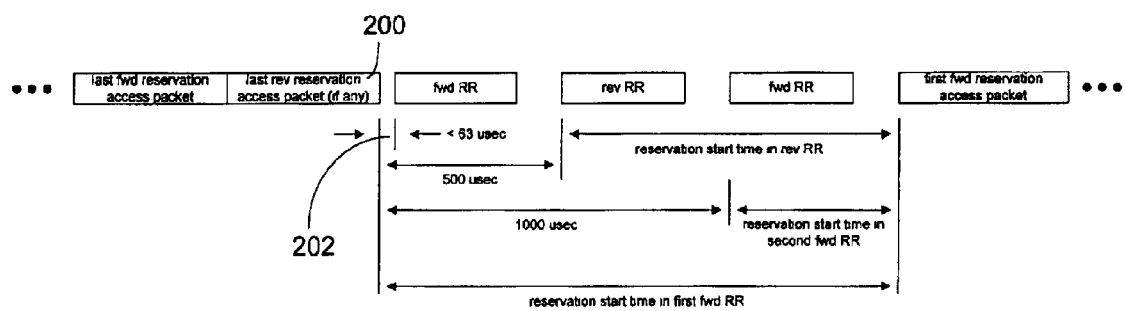
FIG. 3b is a timing diagram showing the timing used by the reservation renewal packets in accordance with the present invention.

The present MAC protocol method and apparatus allocates a time segment immediately following the last reservation access period during which reservations may be renewed or terminated. During this time segment, the two parties involved in a reservation use a three-way handshake to renew or terminate the reservation. This process (for bi-directional reservations) is shown in the message flow diagram of FIG. 3a. FIG. 3b shows a timing diagram used by the reservation renewal packets in accordance with the present invention. As shown in FIG. 3b, if any reverse reservation access packets exist, a last reservation access packet 200 is transmitted at the time indicated. In the embodiment shown in FIG. 3b and described in the attached MAC specification, a 63-micro-second interval 202 immediately following the last reservation access packet 200 of the reservation is reserved for the client that originated the reservation. The client that originated the reservation can use this interval 202 to begin transmission of a ROBO mode broadcast packet containing a reservation renewal (RR) payload message. No other client may attempt to transmit during this 63 microsecond period 202.

If the reservation is no longer needed, the RR payload terminates the reservation by setting the reservation lifetime field in the RR to zero. Otherwise it renews the reservation by providing new timing parameters for the reservation. If the reservation is bi-directional and the originating client determines that a different payload format should be used for reverse transmissions, it forms the packet with the RR payload to include a "PLLC" payload having new parameters to be used by the destination client. The timing information for the reservation must reflect any change in the length of the reservation access packet that will result from the new payload format.

When the destination client receives the RR payload, it responds with another broadcast RR payload. The time for this transmission is reserved so that no other client may transmit during this time and begins 500 microseconds after the conclusion of the last reservation access packet in the reservation. The destination client sets the reservation lifetime field of its RR payload to agree with that in the RR payload received from the originating client. If the reservation is being terminated (in one embodiment, indicated by the reservation lifetime being set to zero) then the handshake is completed once the destination client transmits its RR payload and there is no response from the originating client. If the reservation is being renewed and the destination client determines that a different payload format should be used for forward transmissions, then it includes a "PLLC" payload with the new parameters to be used by the originating client in the packet with the RR payload. The destination client updates the reservation timing information to reflect the time required to support reservation access packets that are formatted with the new payload format.

If the reservation is being renewed, the originating client transmits a broadcast RR payload when the originating client receives the RR from the destination client. The broadcast RR payload contains timing information that the originating client received from the destination client. The time that this transmission occurs is also reserved. That is, no other client may transmit during this time. In one exemplary embodiment, the transmission begins 1000 microseconds after the conclusion of the last reservation access packet in the reservation. This completes the handshake, and the reservation access proceeds as before. Finally, if a reservation is active in a network and a client (other than the originating and destination clients) fails to receive an RR that terminates or renews the reservation, that client must wait for three more cycles of the reservation before determining that the reservation is inactive.

Error Conditions

In some cases, error conditions may make it impossible for a reservation to be established. Either client may reject the information contained in either an RE or an RR payload by setting the status field of the response payload to the appropriate value. In the embodiment described in the attached MAC specification, defined values for this field are:

Status=0: no error condition

Status=1: the reservation is rejected as specified because it interferes with other reservations known to the client sending the status Status=2: the reservation is rejected because the receiver is not ready to accept the data Status=3: a reservation length field exceeds 175 OFDM symbols Status=4: the reservation is rejected for unspecified reasons.

Those skilled in the art shall recognize that alternative values for this field may be used without departing from the spirit or scope of the present invention.

Accordingly, the inventive MAC protocol method and apparatus provides a reservation based access technique in a powerline networking system having no central control mechanism. As described above with reference to FIGS. 2, 3a and 3b, an individual client may establish a reservation. One important aspect of this inventive technique is that all potentially interfering clients are prevented from interfering during the reservation establishment process. In powerline network systems, this task is complicated by the fact that not all clients can receive information from each other due to interference in the power lines.

In the scheme described above, each client maintains a list of active reservations. Timing for the reservations is differential and the master timing is derived from the transmissions of a client pair that first establish the reservation. As a consequence, each new transmission of a client re-establishes the timing reference.

As described above, all reservations are periodic. The period with which the reservation occurs and the amount of time reserved for each period are specified as part of the reservation establishment process. A first client wishing to establish a reservation with a second client must select a period, duration, and starting time for the reservation that are consistent with any existing reservations. The first client transmits a reservation establishment (RE) message to initiate the reservation. The RE contains the period, duration, and start time of the reservation.

The RE is transmitted in a broadcast mode with the intent that all clients should be able to receive it. These clients will then be aware of the timing of the reservation and will avoid transmitting during those times.

Due to the nature of the power line medium, there may be one or more other clients (a third client) that cannot receive transmissions from the first client but are in a position to interfere with the reception of the first client's messages by a second client. To inform these clients of the reservation timing, the second client thus transmits the reservation acknowledgment (RA) message. This message also contains the reservation timing information. The third client should be able to receive this transmission and thereby will be informed of the reservation timing.

As described above, reservations have a maximum allowed lifetime, and after this time they must either be terminated or renewed. This is an important aspect of the present inventive technique. Without maximum allowed lifetimes it would be possible for clients to interpret reservations has having indefinite (perhaps infinite) lifetimes if the clients miss a control message ending the reservation. As described above, the reservation is renewed using RR messages. The RR message operates as a three-way handshake that allows it to be used to renegotiate physical layer parameters based on changing channel conditions. These physical layer parameters might include the modulation type, the error correction coding, and for OFDM systems, the set of frequencies that are used for transmission.

If a client that is not part of the reservation fails to receive the RR messages that either terminate or extend the reservation, it must assume that the reservation has been extended to ensure that there is no collision. Of course, if the reservation was in fact terminated, this client also will not receive an RR after the next lifetime. Per the rules of the protocol, if a client misses three consecutive RR opportunities, it assumes that the reservation has terminated and that the terminating RR was missed. The client then can use the channel during that reserved time.

As described above, another important aspect of the inventive reservation technique is the ability to establish bi-directional reservations. This is a very useful feature for telephony access. Another important aspect of the reservation scheme is that only the initial RE is transmitted in a contention access mode. In other words, when the RE is transmitted, no reservation has been established and the RE consequently may collide with some other client transmissions and therefore may not be received. However, once the RE has been transmitted without collision, a time slot is implicitly provided for the RA and also for the subsequent RR transmissions so that these messages do not have to contend. This makes the messages far more reliable and also makes their use of the channel more efficient because there is no need to re-transmit these messages due to collisions.

A last important aspect of the present inventive reservation scheme is that the other clients can segment their contention-based access messages to conform to the reservations. In other words, if a third client queues a 1 millisecond duration message, for transmission 500 microseconds before the start of a reserved time, the inventive protocol allows the client to divide the message into smaller segments. This allows the third client to transmit part of the message in the 500 microseconds before the reservation and to transmit the rest of the message after the reservation ends. The receiver can then reassemble the original message. This aspect of the reservation scheme improves the overall efficiency of the reservation based access scheme of the present invention.

Logical Network Identifiers (LNI)

As noted above in the background of the invention, the present MAC protocol method and apparatus includes means for uniquely identifying logical networks in the powerline ing system. In accordance with the present method and apparatus, devices (also referred to herein as clients) may only be members of a single logical network. That is, although clients may be electrically (and physically) coupled to the same physical medium as are other clients, they can be treated differently by the present MAC protocol invention using the concept of logical networks. A client is said to belong to one, and only one, logical network. As a consequence, a client may only exchange data with other member clients belonging to its logical network. The present inventive MAC protocol uses logical network identifiers (LNI) to uniquely identify the logical networks in the system.

The clients can use the LNI information to determine if they should attempt to receive a given packet. One approach to transmitting the LNI information is to include the LNI in each packet that is transmitted. Alternatively, the LNI can communicated using a management message in which the transmitting client can declare which LNI it belongs to. Other clients can then build a table that maps client addresses to LNIs. If the format of typical messages includes the address of the source client (as is the case here), then the source address can be used to determine which LNI the client belongs to.

In an ideal world, each logical network sharing a physical medium would have a unique identifier. The number of bits required to represent this identifier is a function of the number of logical networks that can share a physical medium. In one proposed powerline networking system, this number is 128. This would mean that at least 7 bits would be required to represent the LNI.

In systems such as powerline networking systems, where no coordinating management exists, there is no convenient way to ensure that LNIs are not accidentally re-used. As described above, it is not practical (or desirable) for a first user of devices in a first house to ask a second user in a second neighboring house which LNI the second user might have selected, and vice versa. One means for addressing this problem is to ensure that there are far more possible LNIs than the maximum number of logical networks, and then to select the LNIs in a random manner. This approach is similar to the approach used for garage door openers or house keys: there is a finite number of possible keys, but the number is sufficiently large that it is very unlikely that two parties will select the same key settings.

The problem then is to determine which method to use to assign the random values. The present invention solves this problem by using a "password-like" value that is entered by the logical network owner. The inventive method then uses a hash function to map this value to the LNI. In one exemplary embodiment described herein, the street address of a network owner is used for the password value. The network owner would enter this street address information into the powerline networking system during installation of the system. The characters in this address are then converted into a bit sequence using a well known ASCII mapping technique. This bit sequence is then used to create a 32-bit Cyclic Redundancy Check (CRC) (alternative lengths can be selected) which then serves as the LNI. One exemplary embodiment of the LNI of the present invention is described in more detail in section 2.3.1, at pages 10–11, of the attached MAC specification. This exemplary embodiment is now described.

Figure 4:
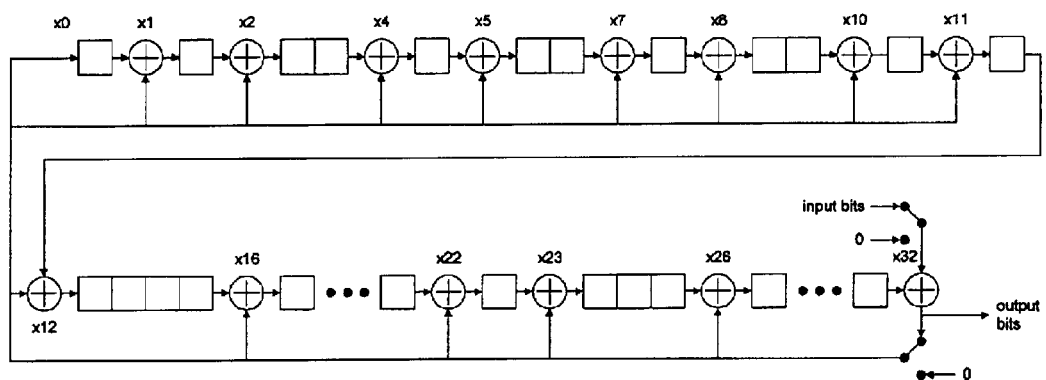
FIG. 4 shows the Cyclic Redundancy Check (CRC) generator used to generate Logical Network Identifiers (LNI) in accordance with one embodiment of the present invention.

As described in the attached MAC specification, the logical network is identified using a 32-bit LNI field in the beacon payload. A network name of any length may be used by the management entity. The network name is compressed to a 32-bit LNI using a 32-bit CRC generator 300 as shown in FIG. 4. The CRC polynomial represented by FIG. 4 is given by Equation 1 below:

Equation 1:
$$G(x) = x^{32} + x^{26} + x^{23} + x^{22} + x^{16} + x^{12} + x^{11} + x^{10} + x^8 + x^7 + x^5 + x^4 + x^2 + x^1 + 1$$

In the embodiment described in the attached MAC specification, the LNI is formed as follows. Registers in the CRC are first initialized to zero. The two switches are set to an "UP" position, and the ASCII translated bits of the network name are input (one at a time) into the CRC generator 300 of FIG. 4. When all of the bits of the network name have been input to the CRC generator 300, the two switches are moved to the "DOWN" position and the CRC generator is clocked 32 times, producing an output bit at each clock. The first output bit is the least significant bit (LSB) of the LNI. The last output bit is the most significant bit (MSB) of the LNI.

With a 32-bit CRC, the probability that two addresses will map to the same 32-bit LNI value is $1/2^{32}$, or about one in four billion. If there are 128 logical networks sharing the same physical medium (as has been proposed in one powerline networking system), then the probability that they will not all choose different LNI values is given by the solution to the well known "birthday problem" given below in Equation 2:

Equation 2:
$$p(m \text{ unique } lni \text{ values with } N \text{ total possible}) = 1 - \frac{N!}{N^m \cdot (N-m)!}$$

For a 32-bit CRC and m=128, this yields a value of about 2 in one million. This probability is sufficiently small to be satisfactory in most system configurations, especially given how infrequently the physical medium will actually be required to support the maximum number of logical networks allowed. Thus, an inventive method of assigning unique LNIs has been described. The inventive method facilitates generation of LNIs with very low probability of non-uniqueness. The method assigns the unique LNIs in a system that has no central controlling authority and that has multiple logical networks sharing a physical medium.

Client devices that lack user input/output (I/O) capability must obtain the LNI from some other device that is connected to the network. This occurs in the process of encryption key distribution described below. In the embodiment described in the attached MAC specification, an "all-zero" LNI is reserved for use by clients that must receive the LNI from another client in this manner. The inventive method of distributing encryption keys, especially for devices that have no user I/O capability, is now described.

Encryption Key Distribution

Encryption systems typically comprise two major components: an algorithm used to operate on data and a key system used to initialize the algorithm. The key system initializes the algorithm so that both the transmitter and the receiver use the algorithm in a manner that allows received data to be deciphered. Most encryption systems rely on the encryption keys for security. Most systems assume that the encryption algorithm is known (or can be derived) by a potential attacker. Prior art cryptography techniques are described in a text by Bruce Schneier, entitled *"Applied Cryptography"*, published by Wiley and Sons in 1996, and hereby incorporated by reference herein for its teachings on cryptography.

Application of cryptography techniques to data networks has primarily been a problem of designing appropriate methods for the secure management of encryption keys. There are relatively few well-tested encryption algorithms currently being used. Most cryptography designs select one of these well-known algorithms. The requirements of the selected key management algorithm depend heavily on the topology of the network. As described above, in the powerline networking system environment, there typically are multiple logical networks sharing a single physical medium. As described above, logical networks are defined as having a group of member clients who are intended to share data. Each member of a logical network therefore "trusts" the other members of the logical network. That is, the assumption is that no member of the logical network will improperly use data that is accessible from other members of the logical network. In practical terms, in powerline networking systems, a logical network might comprise all of the network devices connected together in a given home.

As described above, one of the drawbacks associated with powerline networking systems is that the physical medium (i.e., the power lines) is typically shared between multiple households. Indeed, in a typical configuration, power lines are shared between 5–8 homes in single family dwelling areas, and between more homes in apartment dwellings. Consequently, the multiple homes are able to receive each other's physical layer transmissions. In the absence of some type of encryption technique, each household's data is vulnerable to access by potential attackers in a neighboring house or apartment. In addition, because homes often have exterior outlets as described above, data is also vulnerable to attack by potential intruders via access using the exterior outlets.

Thus an encryption system is needed in powerline networking systems in which data can be safely shared among members of a given logical network and is protected from parties that are not members of the logical network. One straightforward means for managing encryption keys in powerline networking systems is to have the keys manually entered into each client of the logical network. If each client has the same encryption key, the key can simply be derived from a logical network password, which can then be converted into a fixed length encryption key using one of several well-known techniques. For example, a hash function can be used for this purpose wherein the hash function accepts variable length inputs and convert the inputs into fixed length outputs via some difficult-to-reverse algorithm. This approach works quite well, however its applicability to powerline networking systems is limited in situations where some or all of the devices lack a means by which the encryption key can be manually entered. Exemplary devices lacking user I/O capability are network printers and gateway devices (such as cable modems) that allow multiple PCs to share a broadband access device. The present inventive encryption key management method and apparatus provides an encryption key management solution in powerline networking systems, wherein some or all of the devices have limited, or no, user I/O capability.

One exemplary embodiment of the present inventive encryption key management method and apparatus is described in detail in the attached MAC specification in section 2.7, at pages 16–18. The details of the format of the MAC management message used for key update (referred to in the attached MAC specification as the "Encryption key update payload") are given in section 3.1.2.1.1.8, at pages 30–31. This exemplary embodiment is now described. However, those skilled in the encryption key design art shall appreciate that alternative encryption key management embodiments can be used without departing from the spirit or scope of the present invention.

Procedures for Encryption—An Exemplary Embodiment

The powerline networking system security protocol essentially serves three system goals. First, the security protocols used help to ensure the confidentiality of the network. Data transmitted on the physical medium is accessible only to authorized entities. All members of a common logical network are regarded as authorized entities. Second, the security protocol provides for secure key management. The security of encryption keys is maintained. Finally, the security protocol provides an ability to upgrade the encryption algorithms used.

In the embodiment described in the attached MAC specification, the security protocol is intended to ensure that data is known only by the source and destination clients. However, the security protocol does not provide a "non-repudiation" function. That is, receipt of a message from a client does not irrevocably prove that it came from the apparent sender. The security protocol also does not provide for protection against the monitoring of the volume of data that is exchanged in the network. Nor does the protocol protect against attacks that disrupt the network through the use of spurious control messages.

Encryption Algorithm

The baseline encryption algorithm for the powerline networking system of the exemplary embodiment is a Data Encryption Standard (DES) operating as a stream cipher in output feedback mode. One skilled in the encryption art shall recognize that the other algorithms and modes can be utilized with the key management algorithm of the present invention without departing from the scope or spirit of the present invention. The keystream is applied only to the payload bits as indicated in section 3 of the attached MAC specification.

In accordance with the present invention, each client indicates in its beacon payload message which encryption algorithms it supports. A receiving client can indicate which algorithm it desires the source client to use using a "PLLC" payload message as defined in the attached MAC specification. However, the receiving client must select an algorithm that is supported by the source client.

Procedures for Encryption Key Management

As described in the attached specification, all clients that are members of the same logical network must use the same encryption key. It is generally assumed that key changes will be made infrequently in the proposed powerline networking systems. The key is typically provided by a client host to the MAC layer using a "MAC-KEY.req" primitive. As described above, in some cases, some or all of the client devices may lack a user I/O interface suitable for manually entering encryption keys. In these cases, the present invention provides a means for allowing these non-I/O capability clients to use a key received from another client via the physical medium.

A client device lacking user I/O capability must have a key (e.g. default key and "hard-programmed" key) upon entering the network. This key is independent of the network that is associated with the client device. A system user installing the client device can know either the key or the password utilized to create the key. The key typically differs from the key used by other members of the network, and is used only to enable the device to receive the key being used by the other members of the network. In the exemplary embodiment the client always retains this key.

The client device that requires the network key (the "receiving client") obtains the key by receiving an encryption key update payload message from any other device (the "originating client") in the network. One exemplary embodiment of the encryption key update payload message is described in section 3.1.2.1.1.8, at pages 30–31, of the attached MAC specification. As described therein, this payload contains the encryption key currently being used by the network, as encrypted using the hard-programmed key of the receiving client and using an initialization vector contained in the key update payload. In order to minimize the possibility that a Forward Error Correction (FEC) decoder error may erroneously produce a key update, a 32-bit CRC is included in the key update payload. Using the CRC generator 300 of FIG. 4, the CRC is formed over the entire payload prior to encryption. The encryption is applied to the key field and to the CRC field.

The receiving client acknowledges receipt of the encryption key by transmitting a key update acknowledgment payload message. To create this payload message, the receiving client selects a new initialization vector, fills the encryption key field with its hard-programmed key value, and computes a new CRC over the entire payload. It then encrypts the key field and the CRC using information contained in an initialization vector (IV) that is returned in the key update acknowledgment and the key that it previously obtained from the key update message. Henceforth all encrypted fields are encrypted using the key that was received in the key update message.

If the originating client does not receive the key update acknowledgment, it must re-transmit the key update after each beacon it receives from the receiving client. If the receiving client has a network key, but receives another key update message, it must replace the network key currently in use with the network key contained in the key update message. It then must acknowledge the key update message as described above.

In the embodiment described in the attached MAC protocol specification, the key update payload also contains the LNI currently being used by the logical network. The receiving client accepts the LNI only if the CRC passes. The procedures used by the present invention for encryption synchronization are described in detail in section 2.7.3, at pages 17 and 18 of the attached MAC specification.

Thus, an inventive technique for generating and managing encryption keys in powerline networking systems has been described. In practical terms, the above-described technique can be implemented as follows. A device that lacks user I/O capability can be provided with a hard-wired encryption key or default key, which can be set to any possible value. This hard-wired key might be printed on a label that is applied to the packaging of an installation CDR (or other readable medium) that is shipped with the device. When a user installs the device, the user can load the CDR into a networked PC or other device that does have user I/O capability (e.g., a DVD player having a TV and remote control). An installation program on the CDR can be programmed to ask the user for the hard-wired key (wherein the key or the password that gets hashed to create the key is printed on a sticker accompanying the packaging of the device being installed). The installation program can also ask the user for the logical network password. The inventive MAC protocol layer of the powerline network protocol then uses the sticker key to encrypt the current logical network key as described above. The inventive MAC protocol can then transmit this encrypted key to the new device. The logical network key is thus securely passed to the new device, and all other members of the logical network can now exchange encrypted data with the device. If the device loses the logical network key, or if the key changes, another device can re-transmit the key using the same MAC management message originally used to provide the key.

In some ways, it might appear that a more straightforward approach may be to simply use the hard-programmed key for all of the exchanges with the new device. Disadvantageously, this approach has some shortcomings. The difficulty with this approach is that all of the other devices in the logical network must be aware of this key as well. Consequently, the key must either be manually loaded into each device (which may not be possible if the devices do not all have user I/O capability), or the key must be transmitted to the devices using the network. This latter approach is more complicated than simply performing a single key exchange with the new device. In addition, using this approach, all of the other devices are required to maintain separate key information for each device in the logical network. Therefore, although at first glance more straightforward, it is probably more complicated to simply use the hard-programmed key for all of the exchanges with the new device.

In summary, the inventive encryption key management process comprises four main steps. The main steps can be summarized as follows:

1. A first device that does not have user I/O capability has a hard-programmed key assigned to it. The hard-programmed key is used only for an initial key exchange. The first device comprises non-volatile storage or similar memory means for purposes of holding the logical network key.
2. Upon addition of the first device into the logical network, the hard-programmed key is entered into another device member of the logical network (a second device) that does have user I/O capability.
3. The second device then transmits a MAC management message for key update to the first client. This MAC management message contains the currently used logical network key as encrypted using the hard-programmed key of the first device.
4. Upon receipt of the MAC management message, the first device loads the logical network key into a non-volatile storage means. The first device then uses this encryption key for all subsequent encryption operations in the logical network, with the exception that if it receives another key update MAC management message, it will then use its hard-programmed key to decipher.

Although an exemplary embodiment of the encryption key assignment and management method of the present invention has been described, those skilled in the art shall recognize that modifications can be made to the described embodiment without departing from the spirit and scope of the present invention. For example, an alternative means can be used to store the logical network key in the first device without departing from the scope of the present invention. Instead of using a non-volatile storage means, an alternative memory means could be used to store the key information. Further, in an alternative embodiment, the key can be generated without use of a CRC. Alternatively, alternative size CRCs can be used to generate the key. These and other modifications can be made to the exemplary embodiment without departing from the scope of the present invention.

Summary

In summary, an inventive Medium Access Control protocol for powerline networking systems has been described. The inventive MAC protocol controls access to and use of a physical medium (power lines) in a powerline networking system. In one embodiment, the MAC protocol layer of the powerline networking system uses a Carrier Sense Multiple Access (CSMA) protocol with modifications to support special requirements for applications requiring low latency. The protocol supports both contention-based access and reservation-based access. Reservation-based access can operate in either a controller-less mode or in a mode wherein a network controller is present.

A complete MAC protocol is described that specifically addresses concerns unique to home powerline networking systems. In one embodiment, the protocol is intended to operate with a physical layer that uses an OFDM modulation scheme. However, the inventive MAC protocol method and apparatus is contemplated for use with physical layers using other types of modulation schemes. The inventive MAC protocol method and apparatus includes a method of providing "blanking intervals" in which devices using newer versions of the protocol can "clear out" earlier version devices. The use of blanking intervals greatly eases backward compatibility when the protocol is upgraded to newer versions. The method of using blanking intervals is closely coupled to another inventive technique of using "beacons" that propagate the blanking timing information throughout the network. Using the inventive beacon method and apparatus, devices are informed as to whether the blanking information has expired. The inventive MAC method and apparatus also includes a method of establishing and maintaining "virtual circuit" connections between selected clients. Virtual circuits can be established in the powerline networking system even when the networking system does not have a central controller.

The inventive MAC protocol method and apparatus also provides a facility for assigning unique Logical Network Identifiers (LNIs) to logical networks in the powerline networking system. The LNIs uniquely identify each of the logical networks in the network. The LNIs are generated even in systems where no central control mechanism is used. Finally, the inventive MAC protocol method and apparatus includes a means for creating, managing, and distributing network encryption keys. The encryption keys are used by the devices in the powerline networking system to prevent data from being shared with unauthorized users. A method for distributing encryption keys to devices not having user input/output capability is described.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

APPENDIX A

Procedures for Medium Access Control in the PL Network System

ATTORNEY DOCKET NO.: CNXT-002-PROV – APPENDIX A

TABLE OF CONTENTS

| | | |
|---|---|---|
| 1 | INTRODUCTION | 3 |
| | | |
| 2 | PROCEDURES FOR MEDIUM ACCESS CONTROL | 3 |
| 2.1 | PROCEDURES FOR CONTENTION BASED ACCESS | 3 |
| 2.1.1 | IDLE STATE | 4 |
| 2.1.2 | TRANSMIT STATE | 4 |
| 2.1.3 | SUSPEND IDLE STATE | 5 |
| 2.1.4 | DEFER STATE | 5 |
| 2.1.5 | BACKOFF STATE | 7 |
| 2.1.6 | SUSPEND BACKOFF STATE | 8 |
| 2.2 | MAC LAYER BEACONS AND MEDIUM BLANKING PROCEDURES | 8 |
| 2.3 | PROCEDURES FOR NETWORK ENTRY | 10 |
| 2.4 | PROCEDURES FOR CONTROLLERLESS RESERVATION BASED ACCESS | 11 |
| 2.4.1 | RESERVATION ESTABLISHMENT | 11 |
| 2.4.2 | RESERVATION RENEWAL AND TERMINATION | 12 |
| 2.5 | PROCEDURES FOR ESTABLISHING PAYLOAD FORMATS | 15 |
| 2.5.1 | PREDEFINED PAYLOAD FORMATS | 16 |
| 2.5.2 | MASKED TONES | 16 |
| 2.6 | PROCEDURES FOR ENCRYPTION | 16 |
| 2.6.1 | ENCRYPTION ALGORITHM | 17 |
| 2.6.2 | PROCEDURES FOR ENCRYPTION KEY MANAGEMENT | 17 |
| 2.6.3 | PROCEDURES FOR ENCRYPTION SYNCHRONIZATION | 17 |
| 2.7 | PROCEDURES FOR REQUESTING AND TRANSMITTING TEST MESSAGES | 18 |
| 2.8 | PROCEDURES FOR CONTROLLER BASED RESERVATION ACCESS | 18 |
| | | |
| 3 | PACKET FORMATS | 18 |
| 3.1 | CONTENTION ACCESS PACKETS | 19 |
| 3.1.1 | CONTENTION ACCESS PACKET FORMAT | 19 |
| 3.1.2 | PAYLOAD TYPES | 23 |
| 3.2 | RESERVATION ACCESS PACKETS | 33 |
| 3.3 | ACKNOWLEDGMENT PACKETS | 33 |
| 3.4 | PREAMBLE | 34 |
| 3.5 | FEC CODING | 35 |
| 3.5.1 | REED SOLOMON CODING | 35 |
| 3.5.2 | CONVOLUTIONAL CODING | 35 |
| 3.6 | TONE MASKS AND TONE MAPS | 35 |

ATTORNEY DOCKET NO.: CNXT-002-PROV – APPENDIX A

1 Introduction

This document presents a proposed Medium Access Control layer intended to be used with a power line networking physical (phy) layer. It assumes that a number of modifications will be made to the proposed physical layer design. These include:

- Changing the packet format so that a contention mode packet begins with a preamble, followed by a ROBO-like header, followed by a payload section which can be modulated with BPSK, QPSK, or ROBO. It is assumed that there are no multiple PPDU transmissions.

- Adding the capability for reservation based transmissions in which reservation packets do not require a ROBO mode header.

2 Procedures for Medium Access Control

This section describes procedures for Medium Access Control (MAC) layer protocol of the powerline networking system. Formats of management messages used to implement the protocol are described in section 3.

The MAC layer of the powerline (PL) network uses a Carrier Sense Multiple Access (CSMA) protocol with modifications to support special requirements for applications requiring low latency. The protocol supports both contention based access and reservation based access. Reservation based access can operate in either a controller-less mode or in a mode with a network controller.

The MAC layer procedures described in this section make use of the management and data packets defined in section 3.

2.1 Procedures for contention based access

The state machine for the MAC of a transmitting client using contention based access is shown in Figure 1. The processing that occurs in each state is described in the following subsections.

Much of the movement between states in this machine is based on the criterion of the availability of the physical layer medium. For the purposes of this state diagram description, "medium unavailable" is intended to denote any of three events:

- The physical medium is presently being used by another client (carrier sense is active), or
- The physical medium is reserved for use by another client at some time in the near future, and the packet that is ready for transmission is long enough that sending it will interfere with the reservation, or
- A client running an upgraded protocol has declared a blanking period at some time in the near future, and the packet that is ready for transmission is sufficiently long that sending it will interfere with the blanking period. The blanking period is used to prevent v1.0 clients from accessing the physical medium for a period of time so that clients running a different protocol can access the medium without interference from the v1.0 clients.

Because this protocol provides the ability to segment data frames, the latter two situations should arise only when a packet is queued for transmission so close to the time of a reservation or a blanking period, that even a fragment of a packet can not be sent.

ATTORNEY DOCKET NO.: CNXT-002-PROV – APPENDIX A

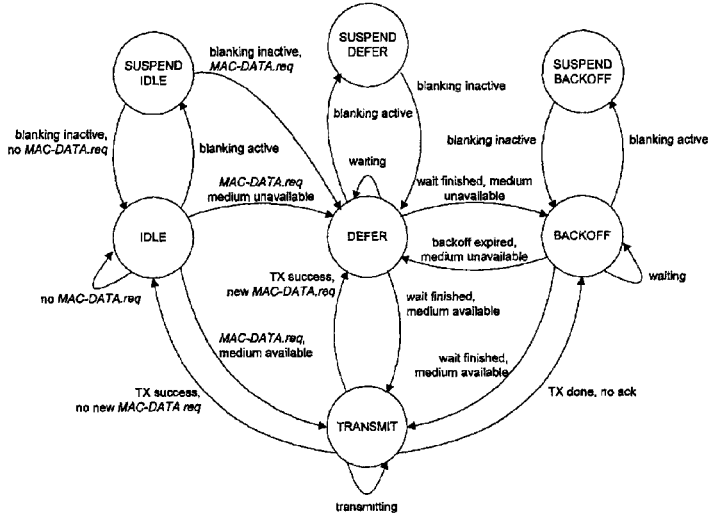

Figure 1 MAC layer state machine with contention based access

2.1.1 IDLE state

In the IDLE state, the MAC is waiting to receive a packet for transmission from the higher layers. The packet is transferred to the MAC via the *MAC-DATA.req* primitive.

If no *MAC-DATA.req* is received and the physical medium is not blanked, the MAC remains in the IDLE state. Upon receipt of a *MAC-DATA.req* primitive, the MAC determines whether or not the physical layer medium is available. If it is, the MAC enters the TRANSMIT state and begins to transmit the packet. If the medium is unavailable, the MAC enters the DEFER state.

If a blanking period becomes active, the MAC transitions to the SUSPEND IDLE state.

2.1.2 TRANSMIT state

In the TRANSMIT state, the MAC transmits the queued packet. At the conclusion of transmission, the intended recipient of the packet acknowledges successful receipt of the packet by transmitting in a time slot reserved for it immediately following the received packet. If the transmitting client receives this acknowledgment it assumes that no collision occurred and that the transmission was successful. If the transmission succeeded and no new *MAC-DATA.req* has been received during the transmission of the packet, it returns to the IDLE state. If the transmission succeeded and a new *MAC-DATA.req* was received, then the MAC transitions to the DEFER state.

In either case, when a transmission succeeds, the MAC state machine sets its backoff window length to zero (see the discussion of the BACKOFF state below).

If no acknowledgment is received, a collision is assumed and the MAC enters the BACKOFF state.

2.1.2.1 Acknowledgment

The time immediately following the transmission of a unicast contention based access packet is reserved for the transmission of an acknowledgment packet by the destination (see section 3.3). The duration of the acknowledgment packet varies depending on the tone mask in use by the network, but is known to all clients. A client transmitting an acknowledgment must begin transmission of the acknowledgment within 128 microseconds after the end of the packet that it is acknowledging.

2.1.3 SUSPEND IDLE state

In the SUSPEND IDLE state, the MAC is waiting for the end of a blanking period. When the blanking period ends, if there is no pending MAC-DATA.req then the MAC transitions back to the IDLE state. If there is a MAC-DATA.req pending, then the MAC transitions to the DEFER state.

2.1.4 DEFER state

In the DEFER state, the MAC has a packet to transmit, but has sensed the presence of another carrier on the physical medium. It thus must wait for the physical medium to become available. Because other clients may also queue packets for transmission during the period that the physical medium is busy, a contention resolution scheme is used to reduce the likelihood of a collision ensuing immediately after the physical medium becomes available.

Figure 2 shows the timing used in contention resolution. The MAC for a client in the DEFER state chooses an integer n at random with a value from 1 to max_slots (a parameter). The value of n indicates the slot in the contention resolution period in which the client should attempt to transmit.

The parameter max_slots is fixed at 8 when the DEFER state is entered from the states IDLE, TRANSMIT or BACKOFF. When the DEFER state is entered from the states SUSPEND IDLE or SUSPEND DEFER, max_slots is set to the value accompanying the blanking period parameters in either the beacon or medium blanking MAC management payloads (see section 3.1.2.1.1.1). Moreover, an additional contention resolution slot is inserted immediately after the end of the blanking period (labeled x in Figure 3). This contention resolution slot is provided strictly for the use of the non-v1.0 device that has established the blanking timing. In the case that the non-v1.0 device uses this slot, then the contention resolution slot timing used at the end of this transmission is the same as that used at the end of the blanking interval. That is to say, the timing is as shown in Figure 3 and the number of contention resolution slots is determined by the max_slots value in the blanking period parameters.

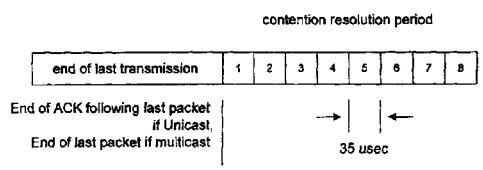

Figure 2 Contention resolution in DEFER state when entered from IDLE, TRANSMIT, or BACKOFF

ATTORNEY DOCKET NO.: CNXT-002-PROV – APPENDIX A

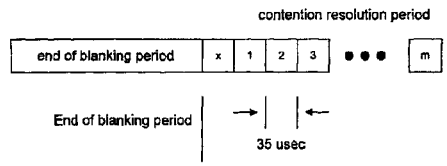

Figure 3 Contention resolution in DEFER state when entered from SUSPEND IDLE or SUSPEND DEFER When the chosen contention resolution time slot is reached, the MAC first determines whether the physical medium is available. If so, it enters the TRANSMIT state and begins to transmit. If the physical medium is unavailable, the MAC does not initiate transmission but instead enters the BACKOFF state.

At times the MAC layer may receive a *MAC-DATA..req* during the contention resolution period. Assuming that the physical medium is available, then the MAC shall immediately initiate transmission.

If a blanking period becomes active before the chosen contention resolution slot, then the MAC transitions to the SUSPEND DEFER state.

2.1.4.1 Establishing the time of the end of a transmission

In most cases, the time at which a transmission will end can be determined from the length field carried in the ROBO mode header. In some cases, a client receiver may detect a preamble but fail to decode the ROBO mode header. This may be due to a collision in which the colliding packets interfere with each other, or it may be due to an excessively degraded channel. In either case, the MAC layer must assume that the packet has the maximum possible length as specified in section 3.1.1.

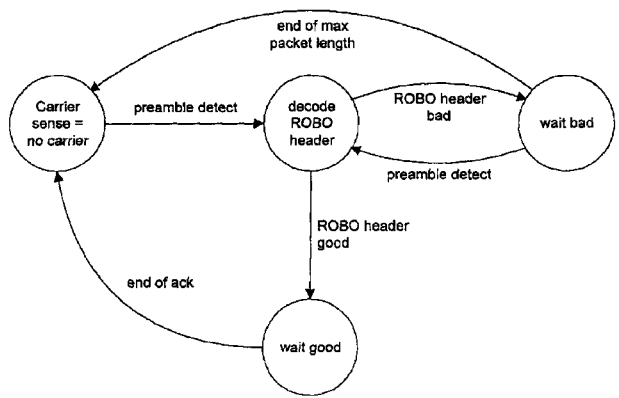

ATTORNEY DOCKET NO.: CNXT-002-PROV – APPENDIX A

Figure 4 State machine for determining end of packet time

Because many packets are shorter than the maximum length it is possible that another transmission will begin before the end of the waiting period described above. The waiting client thus must continue to try to detect preambles while waiting, and if it does detect a preamble, it should then attempt to receive the ROBO mode header. If the new ROBO header is correctly received, the client then waits according to the length in the new ROBO header. Otherwise it returns to waiting for a period equal to the duration of the maximum length packet plus acknowledgment starting from the beginning of the new preamble. The situation is depicted in Figure 4.

2.1.5 BACKOFF state
The BACKOFF state is used to limit congestion on the physical medium by dispersing the transmit times of clients that have interfered with each others transmit attempts. The MAC layer enters the BACKOFF state in two different circumstances; in the first, a collision is assumed to have occurred because a transmitted packet was not acknowledged. This is called a "collision induced" backoff. In the second case, the client was in the DEFER state, but was pre-empted by another client that chose an earlier contention resolution period in which to transmit. This is called a "defer induced" backoff. Either of these events indicates potential congestion.

The backoff algorithm operates by choosing an integer b at random between 1 and a value called the backoff window length. The MAC state machine then clears and starts a backoff timer, which runs until it expires at a time equal to b times 512 microseconds. On expiration of the backoff timer, if the physical medium is available, the MAC enters the TRANSMIT state and begins transmitting. If the physical medium is not available, the MAC enters the DEFER state.

The MAC includes parameters used to determine the backoff window length. These are tabulated in Figure 5. There are three sets of parameters; one set for high priority clients, another for medium and a third set for low priority clients. The client type is designated by the suffix _h, _m or _l at the end of the parameter name.

Upon entering the BACKOFF state for collision induced backoff, the backoff window length is set to the greater of min_col_backoff or the product of the current backoff window length and col_backoff_factor. If the resulting backoff window length exceeds max_col_backoff, the backoff window length is set to max_col_backoff.

Similarly, upon entry to the BACKOFF state for defer induced backoff, the backoff window length is set to the greater of min_defer_backoff or the product of the current backoff window length and defer_backoff_factor. If the resulting backoff window length exceeds max_defer_backoff, the backoff window length is set to max_defer_backoff.

If a blanking period becomes active prior to the expiration of the backoff timer, the MAC transitions to the SUSPEND BACKOFF state.

If the MAC attempts to transmit a packet more than 8 times without success it must discard all queued packets, set the backoff window length to zero, and return to the IDLE state. For this purpose, a transmission attempt is an entry to the TRANSMIT state.

| Parameter | Default value | Meaning |
|---|---|---|
| min_col_backoff_h | 8 | The initial length of the backoff window for high priority |

| | | |
|---|---|---|
| | | clients responding to collision |
| max_col_backoff_h | 256 | The maximum length of the backoff window for high priority clients responding to collision |
| col_backoff_factor_h | 2 | The factor by which the backoff window grows with each collision for high priority clients |
| min_defer_backoff_h | 8 | The initial length of the backoff window for high priority clients responding to preemption in defer |
| max_defer_backoff_h | 256 | The maximum length of the backoff window for high priority clients responding to pre-emption in defer |
| defer_backoff_factor_h | 2 | The factor by which the backoff window grows with each pre-emption for high priority clients |
| min_col_backoff_m | 8 | The initial length of the backoff window for medium priority clients responding to collision |
| max_col_backoff_m | 256 | The maximum length of the backoff window for medium priority clients responding to collision |
| col_backoff_factor_m | 2 | The factor by which the backoff window grows with each collision for medium priority clients |
| min_defer_backoff_m | 8 | The initial length of the backoff window for medium priority clients responding to pre-emption in defer |
| max_defer_backoff_m | 256 | The maximum length of the backoff window for medium priority clients responding to pre-emption in defer |
| defer_backoff_factor_m | 2 | The factor by which the backoff window grows with each pre-emption for medium priority clients |
| min_col_backoff_l | 8 | The initial length of the backoff window for low priority clients responding to collision |
| max_col_backoff_l | 256 | The maximum length of the backoff window for low priority clients responding to collision |
| col_backoff_factor_l | 2 | The factor by which the backoff window grows with each collision for low priority clients |
| min_defer_backoff_l | 8 | The initial length of the backoff window for low priority clients responding to pre-emption in defer |
| max_defer_backoff_l | 256 | The maximum length of the backoff window for low priority clients responding to pre-emption in defer |
| defer_backoff_factor_l | 2 | The factor by which the backoff window grows with each pre-emption for low priority clients |

Figure 5 Backoff parameters

2.1.6 SUSPEND BACKOFF state

In the SUSPEND BACKOFF state, the MAC halts the backoff timer for the duration of the blanking period. When the blanking period ends, the MAC transitions back to the BACKOFF state and the backoff timer is allowed to resume running.

2.2 MAC layer beacons and medium blanking procedures

The MAC layer provides the ability for devices designed to an upgraded version of this protocol to restrict the times in which v1.0 compliant devices can transmit. This capability is provided to prevent v1.0 transmissions from interfering with transmissions of non-v1.0 devices, which may follow medium access rules that are not known to v1.0 devices.

The blanking structure is a repeating sequence of times in which v1.0 devices are restricted from contention based access (the "blanking period") and times when they are allowed contention based access (the "v1.0 period"). Reservation based access by v1.0 devices (see section 2.4) is allowed during the blanking period, but the reservation establishment must be initiated during the v1.0 period.

Figure 6 Blanking structure

The blanking structure is specified by a non v1.0 device. This device transmits a ROBO mode broadcast packet containing a medium blanking payload (see section 3.1.2.1.1.7) which provides a network timing reference and the timing of the blanking period and the v1.0 period. If there are multiple non-v1.0 devices present on the network, these devices must determine which of them is to take responsibility for transmitting the medium blanking information.

The non-v1.0 device must re-transmit the medium blanking payload at least once every five seconds. A special contention resolution slot is provided for the use of the non v1.0 device at the conclusion of each blanking period to ensure that the non-v1.0 device has an opportunity to transmit the blanking information without collision.

Because some clients on the network may be unable to successfully receive the packet containing the medium blanking payload, the MAC protocol includes the capability to propagate the blanking information through the use of beacons. Beacon payloads are transmitted in broadcast packets. Each client transmits beacon packets at a nominal five second rate to indicate its presence in the network and to propagate system timing information. Each client's MAC chooses the exact transmit time for the beacon by selecting an integer t at random between the values of 1 and 1000, and attempting to transmit the packet at a time equal to 4.75 seconds plus t times 500 microseconds since its last beacon transmission. If the physical layer medium is blanked for v1.0 devices at the chosen transmit time then the procedures of section 2.1 must be followed.

If a client receives a medium blanking payload from a non-v1.0 device, it sets the logical distance field of its beacon payload to 0. It sets the beacon fields for duration of the blanking time, duration of the v1.0 time, and max_slots equal to the values received in the medium blanking payload. It computes the current system time by adding the number of microseconds from the start of the first OFDM symbol of the medium blanking message to the start of the first OFDM symbol of the beacon to the system time value in the medium blanking payload.

If the client has not received a medium blanking payload in the last five seconds, then it prepares the contents of its beacon payload using information from the beacon received in the last five seconds with the lowest logical distance. If there are multiple received beacons with the lowest logical distance, then the most recently received beacon shall be used. The client sets the logical distance field of its beacon payload to one more than the logical distance contained in the chosen received beacon. It sets the beacon fields for duration of the blanking time, duration of the v1.0 time, and max_slots equal to the values received in the chosen received beacon. It computes the current system time by adding the number of microseconds from the start of the first OFDM symbol of the chosen received beacon to the start of the first OFDM symbol of the beacon to the system time value in the chosen received beacon payload.

If the logical distance of the chosen beacon exceeds 5, the client assumes that the blanking information is not valid and that the physical medium is continuously available for v1.0 use. It sets the logical distance field of its beacon payload to 7, and it sets the four time fields in octets 2 through 17 to all zeroes.

The packet containing the beacon payload can be used by other clients to assess the link from the transmitting client for the purposes of specifying the payload format to be used on that link. It also can be used to maintain a record of network nodes that each client can communicate with.

2.3 Procedures for network entry

Network entry is the process by which a client having no knowledge of the state of a network gains the knowledge required to allow it to exchange packets with other clients on the network according to the rules for medium access. To enter the network, the client must determine the times at which it may transmit; that is, whether the physical medium is subject to blanking or if there are any reservations active. This requires that the client must remain in receive mode without transmitting for at least five seconds upon initially connecting to the network.

At the end of this five second period, the client may begin to transmit its beacon packet according to the procedures of section 2.2.

The client then may use the procedures of section 2.5 to determine payload formats to be used with each client in the network. Until unique payload formats are negotiated with each client, the entering client must use one of the predefined payload formats to communicate with any other client. When the entering client has determined payload formats for exchanging data with each other client, the network entry process is complete.

2.3.1 Logical Network identifier (LNI)

A client may only be a member of a single logical network. The client can only exchange data with other members of the same logical network. The logical network is identified by a 32 bit LNI field in the beacon payload. A network name of any length may be used by the management entity, but this name is compressed to a 32 bit LNI through the use of a 32 bit CRC as shown in Figure 7. The CRC polynomial represented by this figure is:

$$g(x) = x^{32} + x^{26} + x^{23} + x^{22} + x^{16} + x^{12} + x^{11} + x^{10} + x^8 + x^7 + x^5 + x^4 + x^2 + x^1 + 1$$

The LNI is formed as follows. The registers in the CRC are initialized to zero. The two switches are set to the UP position, and the bits in the network name are input into the CRC generator one at a time. When all of the bits in the network name have been input to the CRC generator, the two switches are moved to the down position and the CRC generator is clocked 32 times, producing an output bit at each clock. The first output bit is the lsb of the LNI and the last is the msb.

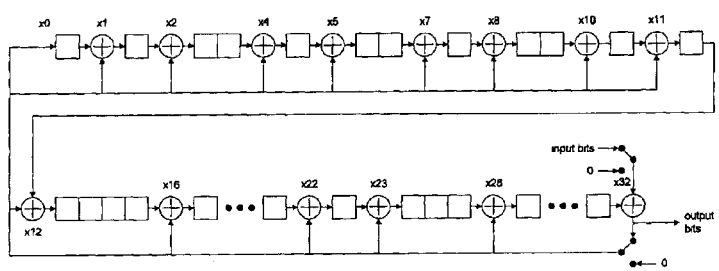

Figure 7 CRC used to generate logical network identifier

ATTORNEY DOCKET NO.: CNXT-002-PROV – APPENDIX A

Client devices that lack an I/O capability must obtain the LNI from another network device. This occurs in the process of encryption key distribution. The all zero LNI is reserved for use by clients that need to receive the LNI from another client in this way.

2.4 Procedures for controller-less reservation based access

The PL network supports a controller-less reservation based access mode that allows the creation of a virtual circuit connection providing a periodic, low latency, constant bit rate service between an originating client and a destination client.

There are three management related procedures relating to controller-less reservation based access: establishment of the reservation, renewal of the reservation, and termination of the reservation. The maximum reservation duration that can be established has 256 periods or 5 seconds, which ever is smaller. At the end of this time, the reservation must either be renewed or terminated. The renewal process provides the ability to change the payload format in response to changing physical medium conditions.

The management packets used to establish, renew, or terminate a reservation are transmitted as broadcast packets in ROBO mode. Because certain nodes may be able to receive from only one of the two clients involved in the reservation, the reservation information is transmitted by both clients that are party to the reservation.

2.4.1 Reservation establishment

A reservation is established by a handshake process in which the originating client establishes the reservation and the intended recipient acknowledges the establishment.

The originating client begins the process of establishing a reservation by broadcasting a ROBO mode packet containing a reservation establishment (RE) payload. This RE payload informs the other clients in the network of the time at which the reservation is to start, the duration of the packets to be transmitted in the reservation, the period of transmission, and the lifetime of the reservation (that is, the number of packets that will be transmitted during the course of the reservation.) It also provides a capability to establish a reservation for a two way circuit connection by allowing the specification of a duration for a return transmission.

A two way reservation consists of a forward transmission and a reverse transmission, while a one way reservation consists only of a forward transmission. The forward transmission always occurs first, and is transmitted by the originating client. If there is a reverse transmission, it occurs immediately after the forward transmission completes, and is transmitted by the destination client. The reverse transmission must have the same period as the forward transmission, but does not have to have the same duration as the forward transmission. The maximum payload length that may be reserved for either the forward or the reverse transmission is 175 OFDM symbols.

Implicit in the reservation is a time slot in which the destination client can acknowledge the reservation, and a later slot in which the clients can exchange broadcast messages that either terminate or renew the reservation. The time slot reserved for the initial reservation acknowledgment always begins 5 milliseconds after the start of the first OFDM symbol of the preamble of the packet containing the RE payload.

The destination client broadcasts its reservation acknowledgment (RA) payload in a ROBO mode packet, repeating the fields describing the timing of the reservation for the benefit of clients that may have failed to receive the original reservation request.

If the originating client fails to receive the RA payload (which may happen due to a collision with its RE transmission or due to a collision with the RA), it assumes that the reservation has not been established and begins a new establishment procedure.

The timing of the reservation establishment procedure is shown in Figure 8.

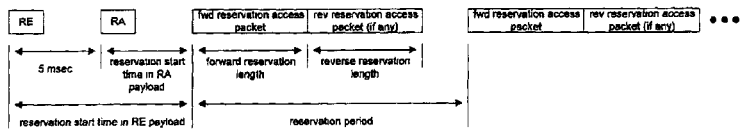

Figure 8 Timing of reservation establishment process

Once the RE and RA have been exchanged, reservation access packets are exchanged according to the agreed upon payload formats. The receiving client does not acknowledge receipt of reservation access packets.

Other clients must not transmit during the reservation time. When a MAC-data.req for contention transmission is received by the MAC layer and the physical medium is determined to be available, the MAC layer must ensure that the physical medium will remain available for the duration of the packet to be transmitted. If this is not the case, the MAC must enter the DEFER state and proceed as described in section 2.1.3.

Timing of the reserved slots is differential; that is, each client predicts the start of the next reserved time from the end of the previous reserved time. When multiple reservations are active simultaneously, the client that established the first reservation serves as the reference for all subsequent reservation timing (meaning that the next reserved time for each active reservation is computed relative to the most recent transmission of the first reservation). When the first reservation concludes, the client that established the next reservation becomes the reference. Clients that require different reservation periods from that used by existing reservations must choose a period such that no multiple of that period will result in an overlap of reserved slots.

2.4.2 Reservation renewal and termination

Immediately following the last reservation access period a segment of time is allotted in which a three way handshake is used by the two parties to a reservation to renew or terminate the reservation. This process is shown (for a bi-directional reservation) in Figure 9, and the timing of the messages is shown in Figure 10. The 63 micro-second interval immediately following the last reservation access packet of the reservation is reserved for the client that originated the reservation to begin transmission of a ROBO mode broadcast packet containing a reservation renewal (RR) payload. No other client may attempt to transmit during this 63 microsecond period.

If the reservation is no longer needed, the RR payload terminates the reservation by setting the reservation lifetime field in the RR to 0. Otherwise it renews the reservation by providing new timing parameters for the reservation.

If the reservation is bi-directional and the originating client determines that a different payload format should be used for the reverse transmissions, then it forms the packet with the RR payload to include a PLLC payload with the new parameters to be used by the destination client. The timing information for the reservation must reflect any change in the length of the reservation access packet that will result from the new payload format.

ATTORNEY DOCKET NO.: CNXT-002-PROV – APPENDIX A

When the destination client receives the RR payload, it responds with another broadcast RR payload. The time for this transmission is reserved so that no other client may transmit during this time and begins 500 microseconds after the conclusion of the last reservation access packet in the reservation.

The destination client sets the reservation lifetime field of its RR payload to agree with that in the RR payload received from the originating client. If the reservation is being terminated (reservation lifetime set to 0) then the handshake is completed once the destination client transmits its RR payload and there is no response from the originating client.

If the reservation is being renewed and the destination client determines that a different payload format should be used for forward transmissions, then it includes a PLLC payload with the new parameters to be used by the originating client in the packet with the RR payload. The destination client updates the reservation timing information to reflect the time needed to support reservation access packets formatted with the new payload format.

If the reservation is being renewed, then when the originating client receives the RR from the destination client it transmits a broadcast RR payload containing the timing information it received from the destination client. The time for this transmission is also reserved (that is, no other client may transmit during this time) and begins 1000 microseconds after the conclusion of the last reservation access packet in the reservation. This completes the handshake, and the reservation access proceeds as before.

If a reservation is active in a network and a client (other than the originating and destination client) fails to receive an RR that terminates or renews the reservation, that client must wait for three more cycles of the reservation before determining that the reservation is inactive.

*Attorney Docket No.: CNXT-002-PROV*     *APPENDIX A*     *page 13*

ATTORNEY DOCKET NO.: CNXT-002-PROV – APPENDIX A

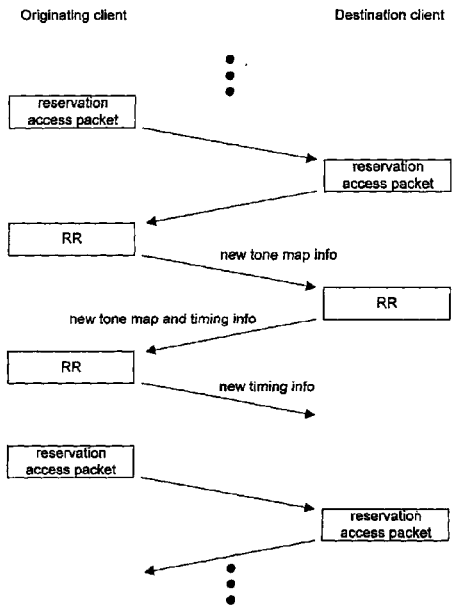

Figure 9 Message flow for reservation renewal

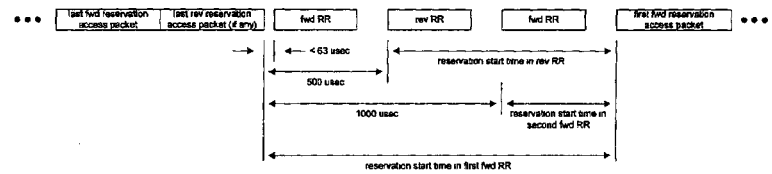

Figure 10 Timing of reservation renewal packets

2.4.3 Error conditions

In some cases, error conditions may make it impossible for the reservation to be established. Either client may reject the information contained in either an RE or an RR payload by setting the status field of the response payload to the appropriate value. Defined values for this field are:

- Status = 0: no error condition

ATTORNEY DOCKET NO.: CNXT-002-PROV – APPENDIX A

- Status = 1: the reservation is rejected as specified because it interferes with other reservations known to the client sending the status

- Status = 2: the reservation is rejected because the receiver is not ready to accept the data

- Status = 3: a reservation length field exceeds 175 OFDM symbols

- Status = 4: the reservation is rejected for unspecified reasons.

2.5 Procedures for segmentation and reassembly

At times frames received from the network layer may not fit in a single maximum length payload, or they may not fit in the time before the channel becomes unavailable due to blanking or a reservation. The MAC protocol includes provisions for segmentation and reassembly of such frames.

Each unicast data payload includes a sequence number and a segment number. The sequence number is incremented each time a complete frame is successfully transmitted (that is, an acknowledgment is received for each packet carrying a segment of the frame). The segment number is set to zero for unsegmented frames, and for segmented frames it indicates which segment of the frame is being carried in the payload.

If a frame is too large to fit in a single MAC layer packet, then the source client MAC must fragment it into segments that fit into the smallest possible number of MAC layer packets. Alternatively, if a frame is too long to be transmitted in the time interval prior to the beginning of a reservation or a blanking period, the frame must be segmented to allow the greatest portion of the frame possible to fit into the available time. In such a case, sufficient time must be allotted for the acknowledgment to be transmitted prior to the reservation or blanking interval. Frames must be segmented if the first resulting segment can have a payload of 10 or more OFDM symbols. Frames must not be segmented otherwise.

The segment number is initially set to the number of segments in the frame. The packet containing the first segment is transmitted, and if the transmission was successful (as indicated by the receipt of an acknowledgment), the segment number is decremented and the next segment is transmitted.

If an acknowledgment is not received for a segment, the source client must follow the procedures for contention based access of section 2.1 to retransmit the segment. Once the segment is successfully transmitted, the segment number is decremented, and the next segment is transmitted. This process continues until all segments have been successfully transmitted. Upon receiving the payload with segment number set to 1, the destination client can then reassemble the frame.

If the destination client receives a unicast data payload from the same source client with a new sequence number but has not received all the segments of the frame with the previous sequence number, it must discard all the segments of the partial frame.

If the destination client receives an out of sequence payload, an error condition has probably occurred and the destination client is likely to lose encryption synchronization. The destination client can indicate this condition to the source client by transmission of a status payload with error code set to 1.

ATTORNEY DOCKET NO.: CNXT-002-PROV – APPENDIX A

2.6 Procedures for establishing payload formats

To enable data transfer with the best possible efficiency, each pair of clients must determine the payload format (that is, the payload tone maps, modulation types, and FEC coding) that provides the best throughput on the link connecting them. The means by which the clients determine the best payload format is implementation dependent, but this specification provides features to facilitate the determination.

There are eight pre-defined payload formats. These are used for various types of broadcast messages and to establish communications before any client-defined payload formats are determined.

The test payload and test packet request payload may be used to sound the link between clients using the procedures of section 2.8.

2.6.1 Predefined payload formats

The table of Figure 11 shows the eight predefined payload formats.

| Payload format index | C   | T   | mod  | Tone map                              |
| -------------------- | --- | --- | ---- | ------------------------------------- |
| 0                    | 1/2 | 8   | ROBO | ffff ffff ffff ffff ffff f (all tones used) |
| 1                    | 3/4 | 8   | ROBO | ffff ffff ffff ffff ffff f (all tones used) |
| 2                    | 1/2 | 4   | ROBO | ffff ffff ffff ffff ffff f (all tones used) |
| 3                    | 3/4 | 4   | ROBO | ffff ffff ffff ffff ffff f (all tones used) |
| 4                    | tbd | tbd | tbd  | tbd                                   |
| 5                    | tbd | tbd | tbd  | tbd                                   |
| 6                    | tbd | tbd | tbd  | tbd                                   |
| 7                    | tbd | tbd | tbd  | tbd                                   |

Figure 11 Predefined payload formats

2.6.2 Masked tones

Regulatory issues may require that certain tones should not be used in some circumstances. These tones are masked through a *MAC-TONE_MASK.req* primitive and are never used by any client on the network.

2.7 Procedures for encryption

The following are the goals of the PL network security protocol:

- *Confidentiality* – data transmitted on the physical medium is known only to authorized entities. All members of a common network are regarded as authorized entities.
- *Secure key management* – security of encryption keys is maintained.
- *Upgradeability* – the encryption algorithm may be changed or modified in future versions of the protocol The security protocol is intended to ensure that data is known only by the source and destination clients. It does not provide non-repudiation; that is, receipt of a message does not prove irrevocably that it came from the apparent sender. The security protocol also does not provide protection against monitoring the volume of data exchanged, and it does not protect against attacks that disrupt the network through the use of spurious control messages.

ATTORNEY DOCKET NO.: CNXT-002-PROV – APPENDIX A

2.7.1 Encryption algorithm

The baseline encryption algorithm for the PL network is the Data Encryption Standard (DES) operating as a stream cipher in output feedback mode. The keystream is applied only to the payload bits so indicated in section 3.

Each client indicates which encryption algorithms it supports in the beacon payload. A receiving client can indicate which algorithm it desires the source client to use through the PLLC payload, but it must select an algorithm supported by that client.

2.7.2 Procedures for encryption key management

All clients that are members of the same logical network must use the same encryption key. It is intended that key changes should be an infrequent event. The key is most typically provided to the MAC layer through a *MAC-KEY.req* primitive from the client host. In some circumstances, client devices may lack an input/output interface suitable for key entry by the end user. In this case, a means is provided by which the key can be received from another client via the physical medium.

A client device that lacks an end user I/O capability must have a hard programmed key when entering the network. This key typically differs from the key used by other members of the network, and is used only to enable the device to receive the key in use by the other members of the network. The client always retains this key.

The client device needing the network key (the "receiving client") obtains it through the receipt of an encryption key update payload from any other device (the "originating client") in the network. This payload contains the key in use by the network encrypted using the hard programmed key for the receiving client using the initialization vector contained in the key update payload. To minimize the probability of FEC decoder error erroneously causing a key update, a 32 bit CRC is included in the payload. The CRC is formed over the entire payload prior to encryption using the CRC generator described in section 2.3.1. The encryption is applied to the key field and the CRC field.

The receiving client acknowledges the receipt of the key by transmitting a key update acknowledgment payload. To form this payload, the client chooses a new initialization vector, fills the key field with its hard programmed key and computes a new CRC over the entire payload. It encrypts the key field and the CRC using the IV returned in the key update acknowledgment and the key that it received in the key update message. Henceforth all encrypted fields are encrypted using the key received in the key update message.

If the originating client does not receive the key update acknowledgment, it must re-send the key update after each beacon that it receives from the receiving client. If the receiving client has a network key but receives another key update message, it must replace the network key in use with the network key in the key update message and acknowledge the key update message as described above.

The key update payload also contains the Logical Network Identifier in use by the logical network. The receiving client accepts the LNI only if the CRC passes.

2.7.3 Procedures for encryption synchronization

The keystream is initialized through the use of the initialization vector (IV), which is provided in the PLLC payload. While the encryption key is common to all clients in the same network, the IV is unique for each point to point link in the network. Each client must maintain the state of an encryption keystream generator for each other client in the network. When it receives a PLLC message with a new IV, a client must immediately update its encryption state machine with this new IV.

Updating the initialization vector should be an infrequent event. It must occur on network entry and whenever the receiving client determines that keystream synchronization may be lost. The client may determine that the initialization vector should be updated for other implementation dependent reasons as well.

When a source client receives a new encryption initialization vector from a destination client, it must reset (i.e. set to 0) its sequence numbers for transmission of unicast data frames to that client.

2.8 Procedures for requesting and transmitting test messages

Any client may request any other client in the network to send a test payload. The test payload can be used to evaluate the physical medium for the purposes of selecting payload format parameters, or it can be used to gather performance statistics for network management purposes.

A client requests a test packet by transmitting the test packet request payload. The addressed client responds with a test packet transmitted according to the procedures for contention based access. The data field of the test packet is filled with unencrypted pseudo random data generated using the linear feedback shift register sequence shown in Figure 12. The shift register is seeded with the seed value provided in the received test packet request payload, with the lsb of the seed being loaded into s0 and the msb into s11.

The test packet is encoded and modulated according to the payload format specified in the test packet request payload.

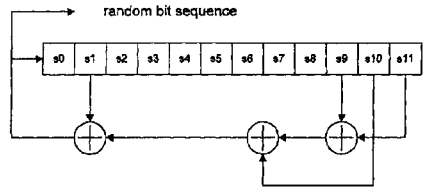

Figure 12 Random sequence generator for test mode

2.9 Procedures for controller based reservation access
To be developed, pending.

3 Packet formats
There are three basic packet types used by the PL network. These are:

- Contention access packets
- Reservation access packets
- Acknowledgment packets Each of these packet types is described below.

3.1 Contention access packets

3.1.1 Contention access packet format

Contention access packets are used for the transmission of data whose arrival time from the higher layers is unpredictable by the PL network MAC layer. The format of a contention access packet is shown in Figure 13. It begins with a preamble sequence (see phy layer specification). The last symbol of the preamble sequence provides the phase reference for the tones in subsequent OFDM symbols.

After the reference symbol is a segment of header information intended to be received by all clients on the network. This header information is transmitted in ROBO mode, with FEC coding and interleaving that spans only this header portion of the packet, so that other clients can decode the header even if they can not decode the payload. The ROBO mode header field has a fixed length.

Following the ROBO mode header is a payload header and data field. The payload header and data field can carry multiple payloads concatenated one after the other. The payload segment has length and payload format described by the ROBO mode header. The maximum length of this field is 255 OFDM symbols (this is sufficient to transport a maximum length Ethernet frame in most of the coding/modulation possibilities with an allowance for tones not used). Payloads requiring more OFDM symbols than 255 must be segmented and transmitted in multiple packets.

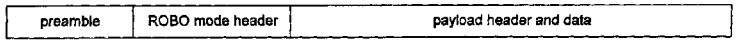

Figure 13 Contention access packet format

3.1.1.1 ROBO mode header field

The ROBO mode header field is shown in Figure 14. There are 20 bits in the ROBO mode header. The meanings of the various fields are as follows:

- *SS* – an index that determines the seed to be used to initialize the scrambler.

- *Payload format index* – the index to the payload format to be used by the recipient of the packet.

- *Payload length* – the number of OFDM symbols that make up the payload portion of the packet. The bits of payload length in octet 9 are the msbs of the payload length. The maximum allowed payload length is 255 OFDM symbols. Packets that can not be fit into this length must be segmented.

- *PV* – an identifier of the version of the protocol used by the transmitting client. For this protocol, PV should be set to zero. If PV is set to a value not understood by the client, the client must ignore the contents of the payload.

ATTORNEY DOCKET NO.: CNXT-002-PROV – APPENDIX A

ROBO mode header

| Bit # -> | 7 | 6 | 5 | 4 | 3 | 2 | 1 | 0 |
|---|---|---|---|---|---|---|---|---|
| octet 1 | payload format index ||||||  SS ||
| octet 2 | payload length in OFDM symbols ||||||||
| octet 3 | not used |||| PV ||||

Figure 14 ROBO mode header field

3.1.1.1.1 ROBO mode header formatting

The ROBO mode header must be encoded and modulated as follows.

The four unused bits of the third octet are filled with zeroes.

The three header octets are encoded with a T=8 Reed Solomon code as described in section 3.5.1. The four zeroes used to pad the third octet are discarded after encoding, yielding a total codeword length of 84 bits. The lsb of the codeword is denoted $c[0]$ and the msb is denoted $c[83]$.

A 3x bit repetition and interleaving scheme is used in forming the ROBO mode header. The interleaving approach divides the set of available (i.e. unmasked) tones into three equal sized sets and transmits one of the three copies of the codeword in each tone set. The second and third copies are circularly shifted in time so that noise events that are impulsive in the time domain will typically only impact one of the three copies of a given bit. The detailed requirements for this interleaving follow.

Let A be the number of unmasked tones, a value less than or equal to 84.

Compute $n = 3*int(A/3)$, where $int(x)$ is the greatest integer less than or equal to x. n/3 is the number of tones available to each of the three repeated versions of the codeword, assuming that an equal number of tones are assigned to each repetition. Thus there are A-n unmasked tones that are not used by the codeword. The bit values assigned to these tones are set to zero.

Compute the number of OFDM symbols, s, required to represent the codeword with a 3x repetition. $s = ceiling(3*84/n)$, where the function $ceiling(x)$ returns the smallest integer greater than or equal to x.

Extend the codeword $c[0]$-$c[83]$ to $c[s*n-1]$ by setting $c[84+e]=0$ for $0 \le e < p$. The value of p is $s*n - 84$.

Compute an offset value $k = s*n/3$.

Define an interleaver memory as the array m[row][col], where row is the row address which ranges from 0 to s-1, and col is the column address which ranges from 0 to 3*n-1. Fill the interleaver memory with codeword bits as follows:

For $0 \le k < n$ and $0 \le r < s$, $m[r][k] = c[k+r*n]$.

For $n \le k < 2n$ and $0 \le r < s$, $m[r][k] = c[mod(k-n+r*n+int(s*n/3),s*n)]$.

ATTORNEY DOCKET NO.: CNXT-002-PROV – APPENDIX A

For $2n \leq k < 3n$ and $0 \leq r < s$, $m[r][k] = c[\mathrm{mod}(k-2n+r*n+\mathrm{int}(2*s*n/3), s*n)]$.

The function mod(x,y) denotes x modulo y.

Each OFDM symbol of the ROBO mode header is then formed from the bits in a row of the interleaver memory, assigning each successive bit of the row to the next available tone in the OFDM symbol. The interleaver row length may be one or two bits shorter than the number of tones available in the OFDM symbol, depending on the number of tones that are masked. In this case, the bit values for the remaining tones must be set to zero.

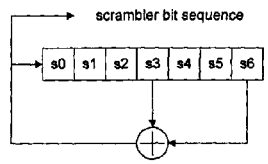

Figure 15 Randomizer block diagram

3.1.1.1.2 Scrambler and scrambler seed

The scrambler used to randomize the data is shown in Figure 15. The contents of the shift register are seeded with the appropriate value from the table of Figure 16 where the msb of the seed is entered in s6 and the lsb in s0. The first bit of the scrambler bit sequence used to cover data is the first bit clocked into s0. The scrambler sequence is applied to all bits in the packet (the ROBO mode header and all payload bits) beginning with the lsb of the payload format index field in the ROBO mode header. The scrambler sequence is not applied to the preamble or the scrambler seed field of the ROBO mode header.

| scram seed index | seed value |
|---|---|
| 0 | 3 |
| 1 | 31 |
| 2 | 55 |
| 3 | 67 |

Figure 16 Mapping of scrambler seeds to index

3.1.1.2 Payload field

The payload field is encoded and modulated using the parameters specified in the ROBO mode header field.

There are several different types of payloads which are described in greater detail below. A client may transmit more than one payload type in a single packet as long as all the payloads have the same destination. When multiple payloads are transmitted in a single packet, the packet is formed by concatenating the payloads one after the other. (For example, a single packet could carry both an Ethernet data payload and a PLLC payload.) The length specified in the ROBO mode header is the length of the concatenated payload.

*Attorney Docket No.: CNXT-002-PROV*   *APPENDIX A*

ATTORNEY DOCKET NO.: CNXT-002-PROV – APPENDIX A

The payload can be used to carry MAC layer management payloads and/or unicast data payloads bearing link layer data.

In this section the general format of the payload field is described. Subsequent sections describe the format of specific payload types.

The first octet of a payload is always the payload type. This field is typically followed by a payload header whose format is implicit from the payload type. The length of a given payload is always either implicit from the payload type or explicitly specified in the body of the payload.

The conventions used in this specification are that less significant bits of a field appear at the right of the octets in the payload, and then when a field requires multiple octets, the lsb appears in the first octet and the msb in the last. When a payload is converted to a serial bit stream, lower numbered octets are sent first, and the rightmost bit of an octet is sent first.

Generic payload format

| Bit # -> | 7 | 6 | 5 | 4 | 3 | 2 | 1 | 0 |
|---|---|---|---|---|---|---|---|---|
| octet 1 | payload type ||||||||
| octet 2-n | data ||||||||

Figure 17 Generic payload format

3.1.1.2.1 Payload formatting

The steps involved in formatting the payload portion of the packet prior to modulation are as follows:

- Extending the payload with all ones
- Exclusive-or with the scrambler sequence
- Reed Solomon encoding
- K=7 convolutional coding
- Interleaving It will often be the case that the payload(s) to be formatted do not fit into an integer number of OFDM symbols. In this case, the payload is extended by appending bits set to 1 until the length is sufficient to fill the last OFDM symbol. If the chosen coding does not allow the padding to exactly fill the last OFDM symbol, then the payload is extended by filling with ones to produce the longest codeword possible that does not extend beyond the last OFDM symbol, and the remaining bit positions in the last OFDM symbol are filled with uncoded bits set to one.

The scrambler process is as described in section 3.1.1.1.2.

The scrambled payload data (which may consist of the concatenation of multiple payloads) is formed into one or more Reed Solomon codewords. The payload data is used to form as many unshortened codewords as possible, starting with the first bit of the payload. The last codeword is shortened if necessary.

The Reed Solomon code words are then converted to a serial bit stream for convolutional encoding.

*Attorney Docket No.: CNXT-002-PROV*   *APPENDIX A*

ATTORNEY DOCKET NO.: CNXT-002-PROV – APPENDIX A

3.1.2 Payload types

3.1.2.1 Contention access payloads

3.1.2.1.1 Management payloads

Management payloads are used for the control and monitoring of the network. The management payload types are:

- Beacon
- Physical layer link control
- Reservation establishment, acknowledgment and renewal
- Test packet request
- Test
- Medium blanking
- Encryption key update, encryption key update acknowledgment 3.1.2.1.1.1 Beacon payload Beacon payloads are transmitted in broadcast packets using ROBO mode.

The beacon payload is shown in Figure 18. The fields of this payload are defined as follows:

- *Current system time* – the system time in microseconds at the start of the first OFDM symbol of the preamble of the packet containing the beacon payload as understood by the transmitting client. If system time is not known, the client sets this field to all zero.

- *Source address* – the 48 bit MAC address of the client transmitting this beacon payload

- *Logical network identifier* – a sixteen bit identifier for the logical network of which the client is a member

- *Start of next blanking time* – the start of the next blanking time in microseconds counted from the start of the first OFDM symbol in the preamble of the packet containing the beacon payload.

- *Duration of the blanking time* – the interval of time (in microseconds) in which v1.0 clients are prohibited from transmitting.

- *Duration of the v1.0 time* – the interval of time (in microseconds) after the blanking time in which v1.0 devices may access the physical medium. The sum of this parameter and the duration of the blanking time is the period of the blanking process, and the pattern of blanking time and v1.0 time repeat with this period until the blanking structure is changed.

- *Max_slots* – the max_slots parameter used by the DEFER state for contention resolution after entry from either the SUSPEND IDLE or SUSPEND DEFER states.

- *Logical distance* – a field that indicates the logical distance from the non-v1.0 device that has established the blanking parameters (see section 2.2).

- *e* – set to 1 if an extension field is present, set to 0 otherwise

ATTORNEY DOCKET NO.: CNXT-002-PROV – APPENDIX A

- *Supported mod types* – indicates which modulation types (as defined in the PLLC payload) are supported by the source client. Setting bit n of this octet to 1 indicates that mod type n is supported.

- *Supported encryption algorithms* – indicates which encryption algorithms (as defined in the PLLC payload) are supported by the source client. Setting bit n of this octet to 1 indicates that encryption algorithm n is supported.

- *Extension field* – additional fields that can be used to represent other upgraded capabilities of this client to be defined in subsequent protocol revisions. The first octet of the extension field is the length of the remainder of the extension field in octets. The contents of the extension field (other than the length) must be ignored by v1.0 clients. The extension field is only present if the e extension bit is set.

If no blanking profile is known, then all bits in octets 8-20 are set to 0.

Beacon packet payload

| Bit # -> | 7 | 6 | 5 | 4 | 3 | 2 | 1 | 0 |
|---|---|---|---|---|---|---|---|---|
| octet 1 | payload type = 0 ||||||||
| octet 2-7 | Source Address ||||||||
| octet 8-11 | logical network identifier ||||||||
| octet 12-15 | current system time in usec ||||||||
| octet 16-18 | start of next blanking time in usec relative to current time ||||||||
| octet 19-21 | duration of blanking time in usec ||||||||
| octet 22-24 | duration of v1.0 time in usec ||||||||
| octet 25 | max_slots ||||||||
| octet 26 | spare |||||| e | logical distance ||
| octet 27 | supported mod types ||||||||
| octet 28 | supported encryption algorithms ||||||||
| octet 29-n | extension field ||||||||

Figure 18 Beacon payload fields

*(Editorial note: The beacon payload could also specify all the other clients that the transmitting client knows about using a distance scheme.)*

3.1.2.1.1.2    Physical layer link control payload

The physical layer link control (PLLC) payload (see Figure 19) is a unicast payload used to specify the payload format that the source client desires the destination client to use when it transmits payloads to the source client.

ATTORNEY DOCKET NO.: CNXT-002-PROV – APPENDIX A

Although the PLLC payload is a unicast payload, the payload format information contained within it may be used by any client that can successfully receive the packet. Each payload format index references a particular set of enabled tones modulated with the specified modulation and encoded with the specified FEC coding. Payload formats corresponding to payload format index 0 through 7 are predefined and may not be defined in a PLLC payload.

The PLLC payload also can be used to transmit an encryption initialization vector to the destination client. Only the destination client may use this initialization vector.

The fields of this payload are defined below:

- *Source address* – the 48 bit MAC address of the client transmitting this PLLC payload

- *Destination Address* – the 48 bit MAC address of the intended recipient of the PLLC payload.

- *Payload format index* – the index for the payload format that the destination client must use when transmitting payloads to the source

- *iv* – when set to 1, indicates that an encryption initialization vector field will follow

- *pf* – when set to one, the pf bit indicates that this PLLC payload will include one or more payload formats. If zero, the payload contains no payload formats. If the iv bit is set, then the payload format information follows the encryption information. Otherwise it appears beginning with octet 16.

- *Spare* – these bits should be set to 0 by v1.0 devices transmitting the payload and should be ignored by v1.0 devices receiving the payload

- *Encryption algorithm* – specifies the algorithm used for encryption. 0 is no encryption, 1 is 56 bit DES in output feedback mode. All other values are undefined. This field is present only if the iv bit is set.

- *Encryption initialization vector* – 64 bits of encryption initialization vector (IV). If the encryption algorithm requires less than 64 bits, the bits used to form the initialization vector are taken starting with the lsb of the first octet of the IV. This field is present only if the iv bit is set.

- *Payload format index* – the payload format index field in any octet after octet 14 is the index used to reference the payload format specified by the code parameters in the same octet and the modulation type and tone map of the subsequent 11 octets. Payload format index values from 0 to 7 are reserved for predefined payload formats. Payload format index values from 8 to 255 may be defined in the PLLC payload.

- *C* – the convolutional code rate to be used in encoding the payload of unicast packets destined for the sender of the PLLC payload. 0 = rate ½ k=7, 1 = rate ¾ k=7, 2 = no convolutional coding. Others are undefined and reserved for future expansion.

- *T* – the number of symbols corrected by the Reed Solomon code to be used in encoding the payload of unicast packets destined for the sender of the PLLC payload. 0 = 4 errors corrected, 1 = 8 errors corrected. Others are undefined and reserved for future expansion.

*Attorney Docket No.: CNXT-002-PROV*     *APPENDIX A*     *page 25*

ATTORNEY DOCKET NO.: CNXT-002-PROV – APPENDIX A

- *Mod type* – the modulation type to be used in formatting the payload of unicast packets destined for the sender of the PLLC payload. 0 = ROBO, 1 = DBPSK, 2 = DQPSK, 3 = D-8PSK, 4 = D-16 star QAM, 5-7 reserved. Types 0, 1 and 2 are mandatory. Types 3 and 4 are optional.

- *m* – (more) if set to 1, there is another payload format following this one. Otherwise, set to 0.

- *Tone map data* – the 84 bits of this field (tm0-tm83) specify that tone n is active when tmn=1 and inactive otherwise. For the nth payload format contained in this PLLC (assuming iv=1), tm0 is the lsb of octet 13n+13 and tm83 is the msb of octet 13n+23.

Physical layer link control payload

| Bit # -> | 7 | 6 | 5 | 4 | 3 | 2 | 1 | 0 |
|---|---|---|---|---|---|---|---|---|
| octet 1 | payload type = 4 ||||||||
| octet 2-7 | Source Address ||||||||
| octet 8-13 | Destination Address ||||||||
| octet 14 | payload format index ||||||||
| octet 15 | spare ||| Encryption algorithm ||| iv | pf |
| octet 16-23 | Encryption initialization vector ||||||||
| octet 24 | payload format index ||||||||
| octet 25 | m | C || T ||| mod type ||
| octet 26-36 | spare ||||||||
| | tone map data ||||||||
| octet 37 | payload format index ||||||||
| octet 38 | m | C || T ||| mod type ||
| octet 39-49 | spare ||||||||
| | tone map data ||||||||

•
•
•

Figure 19 PLLC payload field 3.1.2.1.1.3 Reservation establishment, acknowledgement and renewal payloads The reservation establishment (RE), reservation acknowledgment (RA) and reservation renewal (RR) payloads (see Figure 20) are broadcast payloads used to establish and maintain a circuit connection between two clients. They must be transmitted in ROBO mode. The procedures for using these payloads are described in section 2.4.

The fields of the RE, RA and RR payloads are as follows:

- *Payload type* – set to 5 for RE, 6 for RA and 7 for RR.

ATTORNEY DOCKET NO.: CNXT-002-PROV – APPENDIX A

- *Source Address* – the 48 bit MAC address of the client transmitting this payload

- *Destination Address* – the 48 bit MAC address of the client with whom the circuit connection is to be established.

- *Reservation lifetime* – the duration of the reservation in units equal to the reservation period. When the lifetime has elapsed, the reservation must either be renewed or terminated. In an RR payload that terminates a reservation, the lifetime is set to zero and the subsequent fields are not present.

- *Reservation start time* – the time in microseconds from the start of the first symbol of the preamble of the packet bearing the RE payload to the start of the first symbol of the preamble of the packet to be sent in the first reserved time. This field is not present in an RR payload with lifetime set to zero.

- *Reservation period* – the time in microseconds from the start of the first symbol of the preamble of one packet in the reservation to the start of the first symbol of the preamble of the next packet in the reservation. This field is not present in an RR payload with lifetime set to zero.

- *Forward reservation length* – the length of the forward packet to be transmitted each reservation period in OFDM symbols. This field is not present in an RR payload with lifetime set to zero.

- *Reverse reservation length* – the length of the reverse packet to be transmitted each reservation period in OFDM symbols. If the reservation is one way, this field is set to 0. This field is not present in an RR payload with lifetime set to zero.

- *Status* – Status of the reservation. Set to zero to denote normal condition. Other conditions are described in section 2.4.

Reservation establishment (RE)
reservation acknowledgment (RA) and reservation
renewal (RR) payloads

| Bit # -> | 7 | 6 | 5 | 4 | 3 | 2 | 1 | 0 |
|---|---|---|---|---|---|---|---|---|
| octet 1 | payload type = 5 (RE), 6 (RA) or 7 (RR) | | | | | | | |
| octet 2 - 7 | Source Address | | | | | | | |
| octet 8-13 | Destination Address | | | | | | | |
| octet 14 | Reservation lifetime (periods) | | | | | | | |
| octet 15-16 | Reservation start time | | | | | | | |
| octet 17-19 | Reservation period | | | | | | | |
| octet 20 | Forward reservation length (OFDM symbols) | | | | | | | |
| octet 21 | Reverse reservation length (OFDM symbols) | | | | | | | |
| octet 22 | status | | | | | | | |

Figure 20 Reservation establishment, acknowledgment and renewal payloads

ATTORNEY DOCKET NO.: CNXT-002-PROV – APPENDIX A 3.1.2.1.1.4  Status payload
- *Source Address* – the 48 bit MAC address of the client transmitting this payload

- *Destination Address* – the 48 bit MAC address of the client to which this test packet request payload is addressed.

- *Last good sequence number* – the sequence number of the last complete and in-sequence frame received from the destination client.

- *Status code* – a code to indicate the status of the receiver with respect to the destination client. 0 = ready, 1 = out of sequence, 2 = need encryption initialization vector, 3 = need payload format index. Other values are not defined and should be ignored.

Status payload

| Bit # -> | 7 | 6 | 5 | 4 | 3 | 2 | 1 | 0 |
|---|---|---|---|---|---|---|---|---|
| octet 1 | payload type = 10 | | | | | | | |
| octet 2-7 | Source Address | | | | | | | |
| octet 8-13 | Destination Address | | | | | | | |
| octet 14 | last good seq. no. | | | | status code | | | |

Figure 21 Status payload 3.1.2.1.1.5  Test packet request payload
A test packet request payload is used to cause the recipient to transmit a test packet, and specifies the length and format of the test payload of that packet. The format of the test packet request payload is shown in Figure 22. The fields are defined as follows:

- *Source Address* – the 48 bit MAC address of the client transmitting this payload

- *Destination Address* – the 48 bit MAC address of the client to which this test packet request payload is addressed.

- *Payload length* – the number of OFDM symbols that make up the payload portion of the test packet to be transmitted by the recipient of the test packet request payload. The bits of payload length in octet 9 are the msbs of the payload length.

- *Payload format index* – the index to the payload format to be used in modulating the test packet to be transmitted by the recipient.

- *Random data generator seed* – the initial seed value for the random number generator that the destination client uses to form the test payload. The lsb is bit 4 of octet 10 and the msb is bit 7 of octet 11.

*Attorney Docket No.: CNXT-002-PROV*   *APPENDIX A*   *page 28*

ATTORNEY DOCKET NO.: CNXT-002-PROV – APPENDIX A

Test packet request payload

| Bit # -> | 7 | 6 | 5 | 4 | 3 | 2 | 1 | 0 |
|---|---|---|---|---|---|---|---|---|
| octet 1 | payload type = 2 ||||||||
| octet 2-7 | Source Address ||||||||
| octet 8-13 | Destination Address ||||||||
| octet 14 | payload length in OFDM symbols ||||||||
| octet 15 | payload format index ||||||||
| octet 16 |  ||||||||
| octet 17 | random data generator seed ||||||||

Figure 22 Test packet request payload 3.1.2.1.1.6 Test payload

The test payload (shown in Figure 23) is transmitted by a client in response to a test packet request payload. It is formatted and modulated according to the payload format specified in the test packet request payload. The data field of the test payload consists of pseudo random data generated using the linear feedback shift register shown in Figure 12. The fields of this payload are:

- *Source Address* – the 48 bit MAC address of the client transmitting this payload

- *Destination Address* – the 48 bit MAC address of the client to which this test packet request payload is addressed.

- *Pseudo random data* – the test data generated by the linear feedback shift register.

Test payload

| Bit # -> | 7 | 6 | 5 | 4 | 3 | 2 | 1 | 0 |
|---|---|---|---|---|---|---|---|---|
| octet 1 | payload type = 3 ||||||||
| octet 2-7 | Source Address ||||||||
| octet 8-13 | Destination Address ||||||||
| octet 14-n | pseudo-random data ||||||||

Figure 23 Test packet payload 3.1.2.1.1.7 Medium blanking payload

The medium blanking payload is transmitted in a broadcast packet and allows a non-v1.0 device to confine transmissions of v1.0 devices to a limited time period. The medium blanking payload fields are shown in Figure 24.

- *Source Address* – the 48 bit MAC address of the client transmitting this payload

- *Current system time* – the system time in microseconds at the start of the first OFDM symbol of the preamble of the packet containing the medium blanking payload. The reference for the system time is determined by the source client.

- *Start of next blanking time* – the start of the next blanking time in microseconds counted from the start of the first OFDM symbol in the preamble of the packet containing the medium blanking payload.

- *Duration of the blanking time* – the interval of time (in microseconds) in which v1.0 clients are prohibited from transmitting.

- *Duration of the v1.0 time* – the interval of time (in microseconds) after the blanking time in which v1.0 devices may access the physical medium. The sum of this parameter and the duration of the blanking time is the period of the blanking process, and the pattern of blanking time and v1.0 time repeat with this period until the blanking structure is changed.

- *Max_slots* – the max_slots parameter used by the DEFER state for contention resolution after entry from either the SUSPEND IDLE or SUSPEND DEFER states.

The non-v1.0 client must transmit this payload in ROBO mode with the protocol version of the ROBO header field to indicate 1.0.

Medium blanking payload

| Bit # -> | 7 | 6 | 5 | 4 | 3 | 2 | 1 | 0 |
|---|---|---|---|---|---|---|---|---|
| octet 1 | payload type = 1 ||||||||
| octet 2-7 | Source Address ||||||||
| octet 8-11 | current system time in usec ||||||||
| octet 12-14 | start of next blanking time in usec relative to current time ||||||||
| octet 15-17 | duration of blanking time in usec ||||||||
| octet 18-20 | duration of v1.0 time in usec ||||||||
| octet 21 | max_slots ||||||||

Figure 24 Medium blanking payload 3.1.2.1.1.8  Encryption key update payload

The encryption key update payload is used to provide the current network encryption key to a client that lacks an end-user input/output capability. There are two payloads used for this purpose, a key update payload and a key update acknowledgment. These are shown in Figure 25. The fields are defined as follows:

- *Payload type* – set to 8 for key update and to 9 for key update acknowledgment.

ATTORNEY DOCKET NO.: CNXT-002-PROV – APPENDIX A

- *Source Address* – the 48 bit MAC address of the client transmitting this payload.

- *Destination Address* – the 48 bit MAC address of the destination client.

- *Logical Network Identifier* – the 32 bit identifier for the network that the client is to become part of.

- *Encryption initialization vector* – the initialization vector to be used for deciphering this payload.

- *Spare* – these bits should be set to 0 by v1.0 devices transmitting the payload and should be ignored by v1.0 devices receiving the payload

- *Encryption algorithm* – specifies the algorithm used for encryption. 0 is no encryption, 1 is 56 bit DES in output feedback mode. All other values are undefined.

- *Encryption key* – if the payload type is 8, this field contains the 64 bit encryption key used by the network. If the payload type is 9, this field contains the hard programmed encryption key for the device. If the encryption algorithm requires fewer than 64 bits, then bits of the actual key appear first in the field and the positions for unused bits must be filled with bits generated by a random number generator. This field is encrypted.

- *Frame checksum* – a 32 bit CRC computed over the entire payload starting with the payload type. The frame checksum is computed on the unencrypted payload.

The encryption key field and the frame checksum must be encrypted. All other fields must be transmitted in the clear.

Encryption key update and update ack payload

| Bit # -> | 7 | 6 | 5 | 4 | 3 | 2 | 1 | 0 |
|---|---|---|---|---|---|---|---|---|
| octet 1 | payload type = 8 (update) or 9 (update ack) | | | | | | | |
| octet 2-7 | Source Address | | | | | | | |
| octet 8-13 | Destination Address | | | | | | | |
| octet 14-17 | Logical Network Identifier | | | | | | | |
| octet 18-25 | Encryption initialization vector | | | | | | | |
| octet 26 | spare | | | | | Encryption algorithm | | |
| octet 27-34 | Encryption key | | | | | | | |
| octet 35-38 | Frame checksum | | | | | | | |

Figure 25 Encryption key update and update ack payload

3.1.2.1.2 Unicast data payloads

3.1.2.1.2.1 Ethernet data payload

Ethernet data is transmitted using the payload format of Figure 26. The fields of this payload are defined as follows:

ATTORNEY DOCKET NO.: CNXT-002-PROV – APPENDIX A

- *Payload type* – set to 16 for Ethernet data payloads.

- *Source Address* – the 48 bit MAC address of the client transmitting this payload.

- *Destination Address* – the 48 bit MAC address of the destination client.

- *Length* – The length n in octets of the entire payload

- *Sequence number* – a sequence number that increments module 16 for each new network layer frame transmitted.

- *Segment number* – a number identifying which segment of the frame is transmitted. Procedures for setting the segment number are defined in section 2.5.

- *Data* – the payload data. Includes the ethertype, data and frame checksum fields of the Ethernet frame. The source and destination addresses are not included. The encryption keystream is applied to all bits of this field.

- *Checksum* – a 16 bit CRC computed over octets 2 through n-2 of the payload.

Ethernet data packet payload field

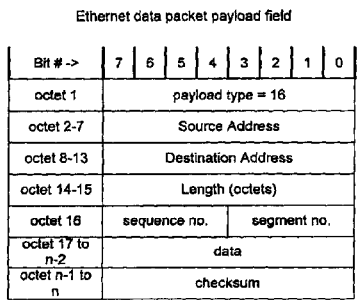

Figure 26 Ethernet data payload 3.1.2.1.2.2  Generic unicast data payload

Other types of network layer data may be transmitted using the generic unicast data payload format of Figure 27. The fields of this payload are defined as follows:

- *Payload type* – set to 17 for generic unicast data payloads.

- *Source Address* – the 48 bit MAC address of the client transmitting this payload.

- *Destination Address* – the 48 bit MAC address of the destination client.

- *Length* – The length n in octets of the entire payload

- *Sequence number* – a sequence number that increments module 16 for each new network layer frame transmitted.

- *Segment number* – a number identifying which segment of the frame is transmitted. Procedures for setting the segment number are defined in section 2.5.

- *Data* – the payload data. The encryption keystream is applied to all bits of this field.

- *Checksum* – a 16 bit CRC computed over octets 2 through n-2 of the payload.

Generic unicast data packet payload field

| Bit # -> | 7 | 6 | 5 | 4 | 3 | 2 | 1 | 0 |
|---|---|---|---|---|---|---|---|---|
| octet 1 | payload type = 17 | | | | | | | |
| octet 2-7 | Source Address | | | | | | | |
| octet 8-13 | Destination Address | | | | | | | |
| octet 14-15 | Length (octets) | | | | | | | |
| octet 16 | sequence no. | | | | segment no. | | | |
| octet 17 to n-2 | data | | | | | | | |
| octet n-1 to n | checksum | | | | | | | |

Figure 27 Generic unicast data payload

3.2 Reservation access packets

Reservation access packets are used when the MAC provides a point-to-point periodic reservation-based circuit connection with another client. These packets do not require any header information since the source, destination, length and formatting have already been negotiated in the process of establishing the reservation. The packet consists of the same preamble used for contention mode packets followed immediately by payload link layer data. No MAC or phy layer headers are included in this packet. The entire payload data field is encrypted.

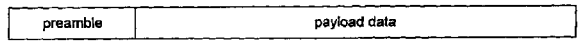

Figure 28 Reservation access packet

3.3 Acknowledgment packets

Acknowledgment packets (see Figure 29) are used to acknowledge the successful receipt of a contention access packet. The acknowledgment consists of a preamble followed by an encoded and interleaved source address. If no tones are masked, then the source address field requires 4 OFDM symbols.

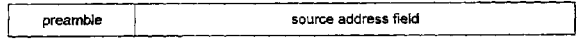

Figure 29 Acknowledgment packet format

ATTORNEY DOCKET NO.: CNXT-002-PROV – APPENDIX A

The source address field contains the address of the client transmitting the acknowledgment and is encoded as follows. The 48 bit source address is encoded with a T=4 Reed Solomon code according to the procedures of section 3.5.1. The resulting code word has 112 bits. The lsb of the codeword is denoted c[0] and the msb is denoted c[111].

A 3x bit repetition and interleaving scheme similar to that used for the ROBO mode header is used in forming the acknowledgment source address field. The interleaving approach divides the set of available (i.e. unmasked) tones into three equal sized sets and maps one of the three copies of the codeword in each tone set. The second and third copies are circularly shifted in time so that noise events that are impulsive in the time domain will typically only impact one of the three copies of a given bit. The detailed requirements for this interleaving follow.

Let A be the number of unmasked tones, a value less than or equal to 84.

Compute $n = 3*int(A/3)$, where $int(x)$ is the greatest integer less than or equal to x. n/3 is the number of tones available to each of the three repeated codewords, with an equal number of tones is assigned to each repetition. Thus there are A-n unmasked tones that are not used by the source address field. The bit values assigned to these tones are set to zero.

Compute the number of OFDM symbols, s, required to represent the codeword with a 3x repetition. $s = ceiling(3*112/n)$, where the function $ceiling(x)$ returns the smallest integer greater than or equal to x.

Extend the codeword c[0]-c[111] to c[s*n-1] by setting c[112+e]=0 for $0 \leq e < p$. The value of p is s*n – 112.

Compute an offset value $k = s*n/3$.

Define an interleaver memory as the array m[row][col], where row is the row address which ranges from 0 to s-1, and col is the column address which ranges from 0 to 3*n-1. Fill the interleaver memory with codeword bits as follows:

For $0 \leq k < n$ and $0 \leq r < s$, m[r][k] = c[k+r*n].

For $n \leq k < 2n$ and $0 \leq r < s$, m[r][k] = c[mod(k-n+r*n+int(s*n/3),s*n)].

For $2n \leq k < 3n$ and $0 \leq r < s$, m[r][k] = c[mod(k-2n+r*n+int(2*s*n/3),s*n)].

The function mod(x,y) denotes x modulo y.

Each OFDM symbol of the source address field is then formed from the bits in a row of the interleaver memory, assigning each successive bit of the row to the next available tone in the OFDM symbol. The interleaver row length may be one or two bits shorter than the number of tones available in the OFDM symbol, depending on the number of tones that are masked. In this case, the bit values for the remaining tones must be set to zero.

3.4 Preamble

All packets begin with a preamble used by the receivers for carrier sense. The receiver also uses the preamble to determine the initial packet timing and the phase reference for each of the tones in the packet.

3.5 FEC Coding

3.5.1 Reed Solomon coding

The PL network employs Reed-Solomon coding over GF(256). The field generator polynomial for the code is:

$$p(x) = x^8 + x^4 + x^3 + x^2 + 1$$

and the code generator polynomial is $$g(x) = (x + \mu^0)(x + \mu^1)(x + \mu^2) \ldots (x + \mu^{2T-1})(x + \mu^{2T})$$

where T is the number of correctable errors in the code and 2T+1 is the number of parity check symbols. T can be either 4 or 8 depending on the type of transmission.

If $b_0$ to $b_{n-1}$ are the n data bytes to be encoded, then the parity check bytes are the coefficients of the remainder of the polynomial division $$b(x) / g(x) \quad \text{where } b(x) = (b_0 x^{2T+1} + b_1 x^{2T+2} + b_2 x^{2T+3} \ldots + b_{n-1} x^{2T+n})$$

The transmitted code word is formed from the polynomial b(x) + remainder(b(x)/g(x)) with the coefficients transmitted in the order of the power of x in the term in which they appear; that is, the coefficient of the lowest power of x first and the highest power of x last. This means that the parity check symbols appear first, followed by the information symbols.

The coefficients are converted to a serial bit stream for subsequent processing. Coefficients are serialized so that the lsb of a coefficient appears first.

3.5.2 Convolutional coding

The convolutional code is a k=7 code with either rate 1/2 or 3/4. Rate 3/4 is obtained by puncturing the rate 1/2 code.

The convolutional encoder is initialized with all zeroes at the start of the payload portion of a packet. The serial stream of bits from the Reed Solomon encoder are passed through the convolutional encoder one bit at a time. After the last bit of the last Reed Solomon codeword is passed into the convolutional encoder, 6 more zero valued bits are input to the encoder to "tail off" the code to the all zero state.

Details of the convolutional code are in the phy layer specification.

3.6 Tone masks and tone maps

Some of the 84 tones in an OFDM symbol may be masked to prevent their use by the PL network. This may be necessary due to local requirements on emissions at certain frequencies. When a tone is masked, the transmitter makes the carrier at that frequency have zero amplitude. All clients on a common network must use the same tone mask.

Tones may also be declared invalid in the tone map requested by the destination through its PLLC payload. A tone is usually declared to be invalid because the error performance at its frequency is unacceptable. Invalid tones have the same amplitude at the transmitter as any other unmasked tone, but they do not carry data. (In the case that the modulation includes amplitude information, then each invalid tone has amplitude equal to the largest amplitude generated by the modulation.)

The carriers for invalid tones are always modulated to create no phase change from one symbol to the next.

4 Needed corrections

Need to make reservations last through blanking period.

Need to make it so that if there is a collision and clients cannot receive the packet length, they assume maximum length. The maximum length needs to be specified.

What is claimed is:

1. A method of performing encryption key management in an AC powerline communication network system, wherein the communication network system includes at least one receiving client device and at least one originating client device, and wherein the at least one receiving client device lacks user input capability, and wherein the at least one originating client device has user input capability, comprising the steps of:

(a) inputting one of a hard-wired key and a password into the at least one originating client device;

(b) creating an encryption key update payload message comprising a current network encryption key encrypted by a hard-wired key;

(c) transmitting the encryption key update payload message from the at least one originating client device to the at least one receiving client device; and (d) replacing a previous network encryption key with the current network encryption key in the at least one receiving client device.

2. The method of performing encryption key management as set forth in claim 1, further comprising the steps of:

(e) creating a key update acknowledgement payload message comprising the hard-wired key encrypted by the current network encryption key;

(f) transmitting the key update acknowledgement payload message from the at least one receiving client device to the at least one originating client device; and (g) re-transmitting the encryption key update payload message transmitted in sub-step (c) of claim 1 until the at least one originating client device receives the key update acknowledgment payload message from the at least one receiving client device, then terminating.

3. The method of performing encryption key management as set forth in claim 1, wherein the inputting step (a) comprises the sub-steps of:

(1) selecting an encryption key algorithm; and (2) inputting one of a hard-wired key and a password into the at least one originating client device.

4. The method of performing encryption key management of claim 3, wherein the encryption key algorithm is a Data Encryption Standard.

5. The method of performing encryption key management of claim 4, wherein the Data Encryption Standard operates as a stream cipher in output feedback mode.

6. The method of performing encryption key management of claim 5, wherein a keystream is applied only to payload bits.

7. The method of performing encryption key management of claim 3, wherein a client device indicates supported encryption algorithms using beacon payload messages.

8. The method of performing encryption key management of claim 1, wherein the encryption key update payload message includes a payload, and wherein the payload includes an initialization vector and a forward error correction.

9. The method of performing encryption key management of claim 8, wherein the payload includes a logical network identifier currently in use in the logical network.

10. The method of performing encryption key management of claim 8, wherein the forward error correction comprises a 32-bit cyclic redundancy code (CRC).

11. The method of performing encryption key management of claim 1, wherein the creating step (b) comprises the sub-steps of:

(1) computing a CRC over an entire encryption key update payload; and (2) encrypting a key field and a CRC field.

12. The method of performing encryption key management of claim 2, wherein the creating a key update acknowledgment step (e) comprises the sub-steps of:

(1) selecting a new initialization vector;

(2) filling an encryption key field with the hard-wired key;

(3) computing a CRC over an entire key update acknowledgment payload; and (4) encrypting the encryption key field and a CRC field.

13. The method of performing encryption key management of claim 2, wherein the re-transmitting step (g) comprises the sub-steps of:

(1) awaiting receipt of a beacon payload message from the at least one receiving device; and (2) re-transmitting the encryption key update payload message transmitted in sub-step (c) of claim 1 until the at least one originating client device receives the key update acknowledgment payload message, then terminating.

14. An encryption key management AC powerline networking circuit, comprising:

(a) at least one originating client device, capable of receiving user input, adapted to input a hard-wired key and a password, wherein the originating client device is adapted to create an encryption key update payload message comprising a current network encryption key encrypted by the hard-wired key, and wherein the originating client device is adapted to transmit the encryption key update payload message to another client device; and (b) at least one receiving client device, operatively coupled to the at least one originating client device, wherein the receiving client device is adapted to receive the encryption key update payload message, and adapted to create a key update acknowledgment payload message comprising the hard-wired key encrypted by a current network encryption key.

15. The circuit of claim 14, wherein the receiving client device is incapable of receiving user input.

16. An AC powerline networking circuit for managing encryption keys, comprising:

(a) means for inputting one of a hard-wired key and a password;

(b) means, responsive to the input means, for encrypting a current network encryption key utilizing a hard-wired key and for encrypting the hard-wired key utilizing a current network encryption key;

(c) means, operatively coupled to the encrypting means, for transmitting an encryption key update payload message to a first device and for transmitting a key update acknowledgment payload message to a second device; and (d) means, responsive to the transmitting means, for receiving a beacon, the encryption key update payload message and the key update acknowledgment payload message.

17. The circuit of claim 16, wherein the first device is incapable of receiving user input.

18. An AC powerline networking circuit for managing encryption keys, comprising:
   (a) means for inputting one of a hard-wired key and a password to a first device;
   (b) a first encrypting means, responsive to the input means, for encrypting a current network encryption key utilizing a hard-wired key;
   (c) a first transmitting means, operatively coupled to the first encrypting means, for transmitting an encryption key update payload message to a second device;
   (d) a first receiving means, operatively coupled to the first transmitting means, for receiving the encryption key update payload message;
   (e) means, operatively coupled to the first receiving means, for decrypting the encryption key update payload message;
   (f) a second encrypting means, operatively coupled to the decrypting means, for encrypting the hard-wired key utilizing the current network encryption key;
   (g) a second transmitting means, operatively coupled to the second encrypting means, for transmitting a key update acknowledgment payload message to the first device; and
   (h) a second receiving means, operatively coupled to the second transmitting means, for determining if a beacon and the key update acknowledgment payload message is received by the first device.

19. The circuit of claim 18, wherein the second device is incapable of receiving user input.

20. A method of managing multiple MAC protocols in an AC powerline communication network system, wherein the communication network system comprises a plurality of devices, and wherein a first set of the plurality of devices uses a first MAC protocol and wherein a second set of the plurality of devices uses a second MAC protocol, and wherein the first MAC protocol is a previous MAC version and the second MAC protocol is a current MAC version, comprising the steps of:
   (a) selecting a newer-version MAC protocol device to control a blanking interval;
   (b) determining a period and a duration of the blanking interval of step (a);
   (c) transmitting a message at a predetermined interval, wherein the message specifies the period and the duration of the blanking interval;
   (d) allowing devices using the second MAC protocol to perform contention-based access during the blanking interval; and
   (e) allowing devices using the first MAC protocol to perform contention-based access during a special contention resolution slot.

21. The method of managing multiple MAC protocols of claim 20, wherein the current MAC version is a non-v1.0 MAC version and the previous version is a v1.0 MAC version.

22. The method of managing multiple MAC protocols of claim 20, wherein the predetermined interval is approximately five seconds.

23. The method of managing multiple MAC protocols of claim 20, wherein the determining step (b) comprises the sub-steps of:
   (1) monitoring communication traffic; and
   (2) determining a period and a duration for the blanking interval based upon the communication traffic monitored during sub-step (1).

24. The method of managing multiple MAC protocols of claim 20, wherein the message is a medium blanking payload message, and wherein the medium blanking payload message specifies the period and the duration.

25. The method of managing multiple MAC protocols in an AC powerline communication network system of claim 20, wherein the message comprises a medium blanking payload message and a beacon message, and wherein the beacon message specifies the period and the duration.

26. The method of managing multiple MAC protocols in an AC powerline communication network system of claim 20, wherein the transmitting step (c) comprises transmitting a ROBO-mode broadcast packet including a medium blanking payload message, wherein the medium blanking payload message specifies the period and the duration.

27. The method of managing multiple MAC protocols in an AC powerline communication network system of claim 20, wherein the message transmitted at the step (c) provides a network timing reference and network timing information pertaining to the blanking interval.

28. The method of managing multiple MAC protocols in an AC powerline communication network system of claim 20, wherein the method further includes a random backoff step wherein devices having queued packets for transmission randomly transmit their queued packets after the blanking interval.

29. The method of managing multiple MAC protocols in an AC powerline communication network system of claim 20, wherein the method further includes a random backoff step wherein devices having queued packets for transmission transmit their queued packets immediately subsequent to the blanking interval.

30. A method of controller-less reservation based access in an AC powerline communication network system, wherein the communication network system includes a plurality of communication clients, comprising the steps of:
   (a) broadcasting a reservation establishment payload that establishes a reservation between an originating client and a recipient client;
   (b) determining a reservation schedule based upon clients that have active reservations, wherein the reservation schedule includes a plurality of reservation access periods, and wherein a specified originating client and a specified recipient client communicate during a specified reservation access period;
   (c) transmitting information between clients during the plurality of reservation access periods based upon the reservation schedule determined during step (b); and
   (d) determining whether to renew or to terminate reservations.

31. The method of controller-less reservation based access of claim 30, wherein the step (a) of broadcasting a reservation establishment payload comprises broadcasting a ROBO mode packet comprising a reservation establishment payload.

32. The method of controller-less reservation based access of claim 30, wherein the reservation establishment payload includes information pertaining to reservation start time, packet duration, transmission period and reservation lifetime.

33. The method of controller-less reservation based access of claim 30, wherein the reservation includes a two-way reservation, and wherein the two-way reservation comprises a forward transmission and a reverse transmission.

34. The method of controller-less reservation based access of claim 30, wherein the broadcasting ste p (a) comprises the sub-steps of:
  (1) broadcasting a ROBO mode packet including a reservation establishment payload; and
  (2) transmitt networking a reservation ackn owledgement payload from the recipient client.

35. The method of controller-less reservation based access of claim 33, wherein the forward transmission and the reverse transmission have the same transmission period.

36. The method of controller-less reservation based access of claim 30, wherein the reservation comprises a one-way reservation, and wherein the one-way reservation comprises a forward transmission.

37. The method of controller-less reservation based access of claim 30, wherein reservations are renewed by broadcasting a ROBO mode packet including a reservation renewal payload message.

38. The method of controller-less reservation based access of claim 30, wherein reservations are renewed and terminated only after the occurrence of a last reservation access period.

39. The method of controller-less reservation based access of claim 30, wherein reservations are renewed and terminated only immediately subsequent to the occurrence of a last reservation access period.

40. The method of controller-less reservation based access of claim 30, wherein reservations are terminated in accordance with the following sub-steps:
  (1) loading a zero value into a reservation lifetime field in a reservation renewal payload message; and
  (2) transmitting the reservation renewal payload message.

41. A method of identifying logical networks in an AC powerline communication network system, wherein the communication network system comprises a plurality of communication clients, and wherein each client is uniquely associated with a logical network, the method comprising the steps of:
  (a) determining a unique logical network identifier (LNI) for a selected plurality of clients;
  (b) broadcasting information regarding the unique LNI;
  (c) creating tables that map client addresses to the LNI; and
  (d) communicating data only between the selected plurality of clients associated with the unique LNI.

42. The method of identifying logical networks in an AC powerline communication network system of claim 41, wherein the determining step (a) comprises the sub-steps of:
  (1) inputting a password; and
  (2) hashing the password to map the password to a logical network identifier (LNI).

43. The method of identifying logical networks in an AC powerline communication network system of claim 42, wherein the hashing sub-step (2) comprises compressing the password into a 32-bit LNI by generating a 32-bit CRC code for the password.

44. The method of identifying logical networks in an AC powerline communication network system of claim 42, wherein the password comprises a street address of an owner of the AC powerline communication network.

45. The method of identifying logical networks in an AC powerline communication network system of claim 42, wherein the password comprises a network name.

46. The method of identifying logical networks in an AC powerline communication network system of claim 42, wherein the password is input during installation of the AC powerline communication network.

47. The method of identifying logical networks in an AC powerline communication network system of claim 41, wherein the LNI is communicated to the selected plurality of clients via a beacon payload message.

48. The method of identifying logical networks in an AC powerline communication network system of claim 43, wherein the 32-bit CRC code for the password is formed by using an ASCII-mapped translation of the password in accordance with the following CRC polynomial:

$$g(x)=x^{32}+x^{26}+x^{23}+x^{22}+x^{16}+x^{12}+x^{11}+x^{10}+x^8+x^7+x^5+x^4+x^2+x^1+1.$$

49. The method of identifying logical networks in an AC powerline communication network system of claim 43, wherein the LNI has a selected length of N bits, and wherein the LNI is obtained by generating an N-bit CRC code for the password.

50. A method of controlling communication between devices in an AC powerline communication network system, wherein a first set of the devices uses a first MAC protocol and wherein a second set of the devices uses a second MAC protocol, wherein the first MAC protocol is a previous MAC version and the second MAC protocol is a current MAC version, and wherein medium blanking messages are transmitted on the network by a controlling one of the second set of devices, wherein the blanking messages contain blanking information that defines a blanking interval during which only the second set of devices are allowed to communicate, comprising the steps of:
  (a) determining whether a selected device is capable of receiving the blanking messages from the controlling device;
  (b) if the selected device is capable of receiving the blanking messages, assembling a respective and associated beacon message unique to the selected device, wherein the assembled beacon message is based upon information contained in received blanking messages, and wherein the beacon message includes blanking information contained in the received blanking messages, and proceeding to step (d), else proceeding to step (c);
  (c) if the selected device is incapable of receiving the blanking messages, assembling the beacon message based upon beacon messages received from other network devices, wherein each beacon message includes a lifetime field that is used by all of the devices in determining whether to use a received beacon message when assembling their respective and associated beacon messages; and
  (d) periodically transmitting the beacon message assembled in steps (b) or (c) to other devices in the network.

51. The method of controlling communication between devices in an AC powerline communication network system of claim 50, wherein the current MAC version is a non-v1.0 MAC version and the previous MAC version is a v1.0 MAC version.

52. The method of controlling communication between devices in an AC powerline communication network system of claim 50, wherein the lifetime field of the assembled beacon message is set to zero whenever the selected device receives a blanking message from the controlling device.

53. The method of controlling communication between devices in an AC powerline communication network system of claim 50, wherein the lifetime field of the assembled beacon message is set to a non-zero number whenever the selected device is incapable of receiving blanking messages from the controlling device.

54. The method of controlling communication between devices in an AC powerline communication network system of claim 50, wherein the selected device is determined incapable of receiving blanking messages only if it has not received a blanking message within a predetermined threshold of time.

55. The method of controlling communication between devices in an AC powerline communication network system of claim 54, wherein the predetermined threshold comprises 5 seconds.

56. The method of controlling communication between devices in an AC powerline communication network system of claim 53, wherein the non-zero number comprises a lowest lifetime field value of all beacon messages received by the selected device within a predetermined recent time period.

57. The method of controlling communication between devices in an AC powerline communication network system of claim 56, wherein the recent time period comprises the most recent 5 seconds.

58. The method of controlling communication between devices in an AC powerline communication network system of claim 50, wherein when the selected device is incapable of receiving blanking messages, the selected device assembles its respective and associated beacon message based upon a received basis beacon message, wherein the basis beacon message comprises a received beacon message having a lowest lifetime field value of all received beacon messages.

59. The method of controlling communication between devices in an AC powerline communication network system of claim 58, wherein only beacon messages received within a recent time period are considered in determining the basis beacon message.

60. The method of controlling communication between devices in an AC powerline communication network system of claim 59, wherein the recent time period comprises the most recent 5 seconds.

61. The method of controlling communication between devices in an AC powerline communication network system of claim 59, wherein when two or more received beacon messages have equally low lifetime field values, the basis beacon message comprises a most recently received beacon message having the equally low lifetime field value.

62. The method of controlling communication between devices in an AC powerline communication network system of claim 59, wherein the selected device sets a lifetime field value of its assembled beacon message equal to the lifetime field value of the basis beacon message, incremented by one.

63. The method of controlling communication between devices in an AC powerline communication network system of claim 50, wherein the lifetime field value of all beacon messages has a predetermined maximum.

64. The method of controlling communication between devices in an AC powerline communication network system of claim 63, wherein the predetermined maximum is 7.

65. The method of controlling communication between devices in an AC powerline communication network system of claim 63, wherein when all of the beacon messages transmitted on the network have lifetime field values equal to the maximum, the blanking interval is assumed to be nonexistent, and the devices are allowed to transmit at any time.

66. The method of controlling communication between devices in an AC powerline communication network system of claim 50, wherein the beacon messages are used to specify a period and duration of the blanking interval, and an exact time instant at which the blanking interval begins.

67. The method of controlling communication between devices in an AC powerline communication network system of claim 50, wherein the beacons contain information regarding the capability and limitation of the devices in the network.

* * * * *

UNITED STATES PATENT AND TRADEMARK OFFICE
CERTIFICATE OF CORRECTION

| | |
|---|---|
| PATENT NO. | : 6,854,059 B2 |
| APPLICATION NO. | : 09/876454 |
| DATED | : February 8, 2005 |
| INVENTOR(S) | : Gardner et al. |

It is certified that error appears in the above-identified patent and that said Letters Patent is hereby corrected as shown below:

In the claims, column 103, line 6, reading "transmit networking a reservation ackn owledgement" should read -- transmitting a reservation acknowledgement --.

Signed and Sealed this

Twelfth Day of September, 2006

JON W. DUDAS
*Director of the United States Patent and Trademark Office*